US011625105B2

(12) United States Patent
Litschel

(10) Patent No.: US 11,625,105 B2
(45) Date of Patent: Apr. 11, 2023

(54) METHOD FOR INPUTTING AND OUTPUTTING A TEXT CONSISTING OF CHARACTERS

(71) Applicant: CARETEC INTERNATIONAL GMBH, Vienna (AT)

(72) Inventor: Dietmar Litschel, Vienna (AT)

(73) Assignee: CARETEC INTERNATIONAL GMBH, Vienna (AT)

( * ) Notice: Subject to any disclaimer, the term of this patent is extended or adjusted under 35 U.S.C. 154(b) by 0 days.

(21) Appl. No.: 16/620,486

(22) PCT Filed: Jun. 7, 2018

(86) PCT No.: PCT/AT2018/000053
§ 371 (c)(1),
(2) Date: Dec. 7, 2019

(87) PCT Pub. No.: WO2018/223162
PCT Pub. Date: Dec. 13, 2018

(65) Prior Publication Data
US 2021/0286441 A1 Sep. 16, 2021

(30) Foreign Application Priority Data
Jun. 7, 2017 (AT) .................................. A 242/2017

(51) Int. Cl.
*G06F 3/02* (2006.01)
*G06F 3/01* (2006.01)
(Continued)

(52) U.S. Cl.
CPC ............ *G06F 3/0219* (2013.01); *G06F 3/016* (2013.01); *G06F 3/167* (2013.01); *G09B 21/002* (2013.01);
(Continued)

(58) Field of Classification Search
CPC ........ G06F 3/0219; G06F 3/016; G06F 3/167; G06F 3/0237; G06F 3/0233;
(Continued)

(56) References Cited

U.S. PATENT DOCUMENTS 4,042,777 A 8/1977 Bequaert et al.
7,177,797 B1 * 2/2007 Micher ................. G06F 40/274
715/272
(Continued)

FOREIGN PATENT DOCUMENTS

WO 01/11849 A1 2/2001
WO 2010/049520 A2 5/2010

OTHER PUBLICATIONS

International Search Report, dated Jan. 15, 2019 for International Application No. PCT/AT2018/000053.
(Continued)

*Primary Examiner* — Grant Sitta
(74) *Attorney, Agent, or Firm* — FisherBroyles, LLP

(57) ABSTRACT

A method for inputting and outputting a text comprising characters is disclosed, wherein the text is input via an input unit and/or output via an output unit in the form of a combination of full text and short text. The short text is input and/or output including at least one abbreviation in the form of characters or combinations of characters, to which predefined full text contents are allocated.

18 Claims, 19 Drawing Sheets

(51) Int. Cl.
*G06F 3/16* (2006.01)
*G09B 21/00* (2006.01)
*G09B 21/04* (2006.01)
*G10L 13/02* (2013.01)

(52) U.S. Cl.
CPC .......... *G09B 21/004* (2013.01); *G09B 21/04* (2013.01); *G10L 13/02* (2013.01)

(58) Field of Classification Search
CPC .... G09B 21/002; G09B 21/004; G09B 21/04; G09B 21/003; G09B 21/02; G10L 13/02
See application file for complete search history.

(56) References Cited

U.S. PATENT DOCUMENTS

| | | | |
|---|---|---|---|
| 7,886,233 B2* | 2/2011 | Rainisto | G06F 3/04886 715/825 |
| 8,185,841 B2* | 5/2012 | Rainisto | G06F 40/274 710/30 |
| 2005/0104750 A1* | 5/2005 | Tuason | G06F 3/0219 341/22 |
| 2008/0297475 A1 | 12/2008 | Woolf et al. | |
| 2009/0256802 A1* | 10/2009 | Lou | G06F 3/042 345/157 |
| 2010/0134425 A1* | 6/2010 | Storrusten | G06F 3/0488 345/173 |
| 2011/0199309 A1* | 8/2011 | Chuang | G06F 3/0213 345/173 |
| 2011/0216006 A1 | 9/2011 | Litschel | |
| 2012/0072838 A1 | 3/2012 | Ramachandra | |
| 2012/0223889 A1* | 9/2012 | Medlock | G06F 40/274 345/173 |
| 2012/0326984 A1* | 12/2012 | Ghassabian | G06F 3/04886 345/168 |
| 2014/0028564 A1* | 1/2014 | Valentine | G06F 3/0213 345/168 |
| 2014/0218299 A1* | 8/2014 | Kataoka | G06F 40/274 345/168 |
| 2015/0019539 A1* | 1/2015 | Cheung | G06F 40/274 707/723 |
| 2015/0082229 A1* | 3/2015 | Ouyang | G06F 3/04886 715/773 |
| 2015/0089435 A1* | 3/2015 | Kuzmin | G06F 3/04886 715/773 |
| 2015/0113073 A1* | 4/2015 | Chan | G06F 40/274 709/206 |
| 2015/0347007 A1* | 12/2015 | Chaudhri | G06F 40/232 715/773 |
| 2015/0379895 A1* | 12/2015 | Chari | G09B 21/004 434/114 |
| 2016/0005150 A1* | 1/2016 | Ghassabian | G06F 3/0488 345/654 |
| 2016/0034181 A1* | 2/2016 | Norris, III | G06F 3/0237 715/773 |
| 2016/0224540 A1* | 8/2016 | Stewart | G06F 40/232 |
| 2017/0199665 A1* | 7/2017 | Zhai | G06F 3/04886 |
| 2017/0206193 A1* | 7/2017 | Bi | G06F 3/04886 |
| 2020/0228638 A1* | 7/2020 | Ghassabian | G06F 1/1684 |

OTHER PUBLICATIONS

Written Opinion for International Application No. PCT/AT2018/000053.
Austria search report received for Austria Application No. A 242/2017, dated Jul. 12, 2017, 1 page.
International Preliminary Search Report for International Application No. PCT/AT2018/000053, dated Sep. 16, 2019, 6 pages.

* cited by examiner

Fig. 3A1
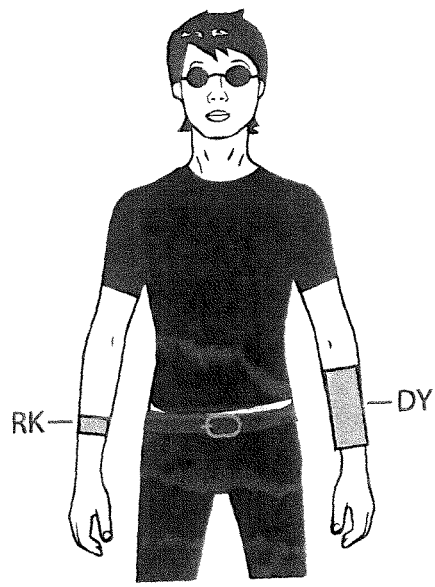
Fig. 3A2a
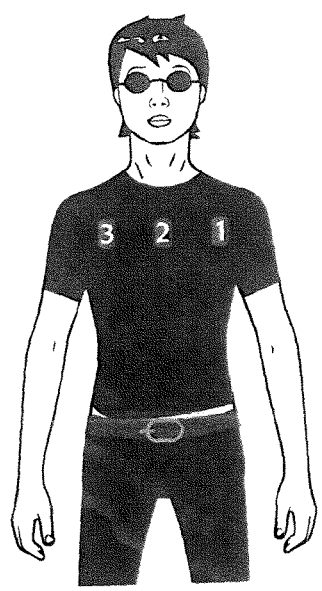
Fig. 3A2b
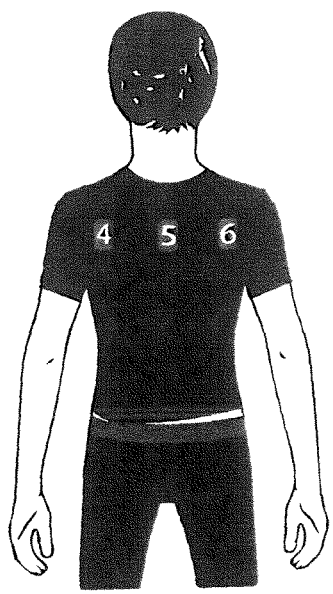
Fig. 3A3
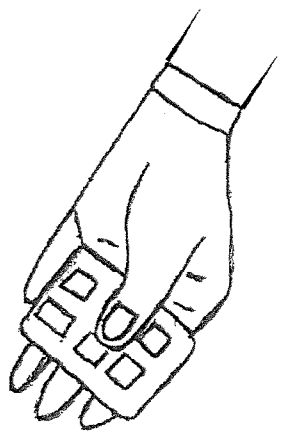
Fig. 3A4
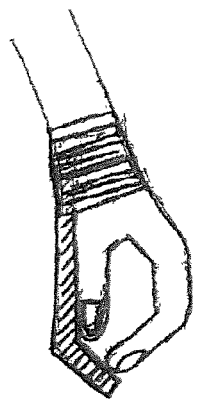

Fig. 4A3
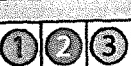

Fig. 6D
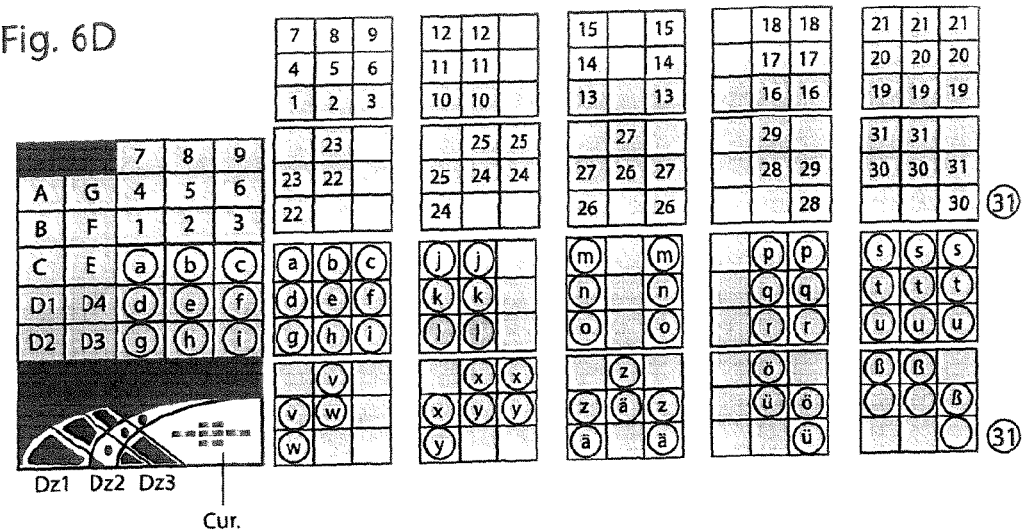
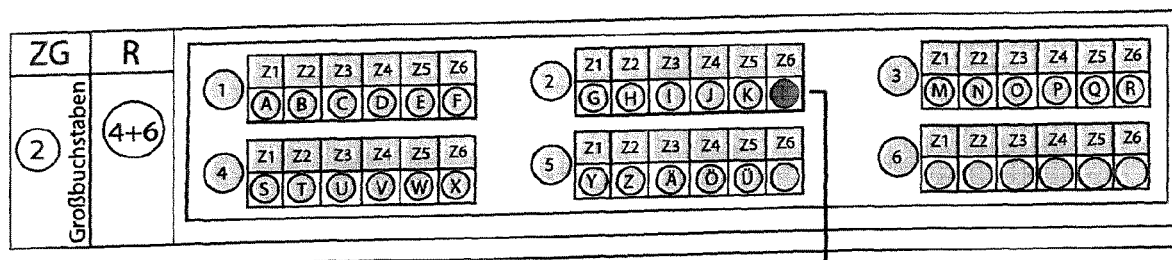
L = Länder der Welt
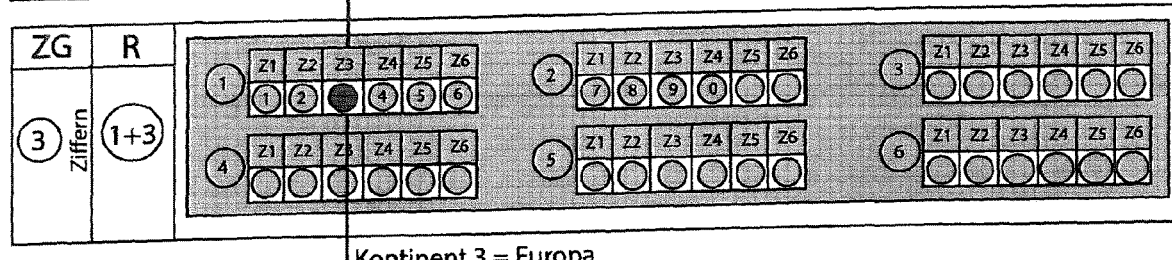
Kontinent 3 = Europa
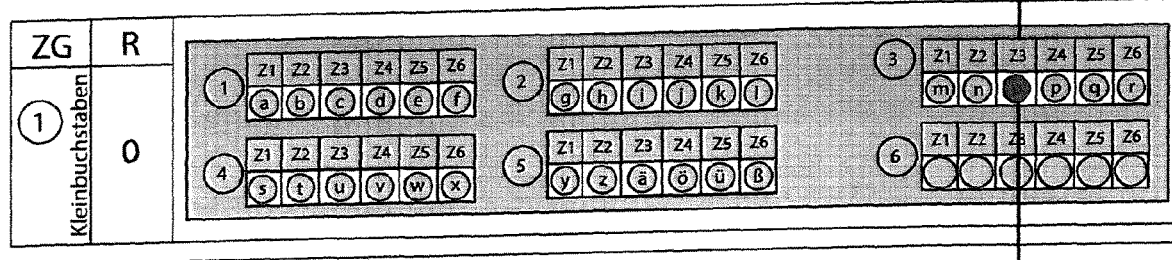
L + 3 + o = Österreich Fig. 7A
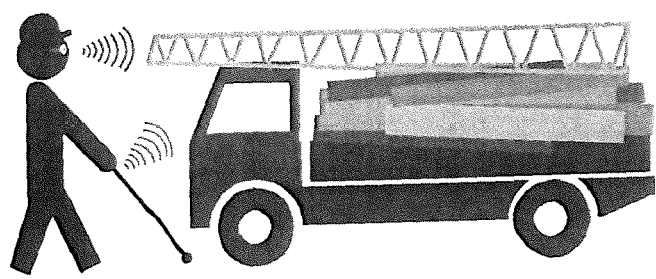
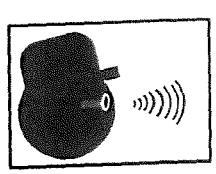
1
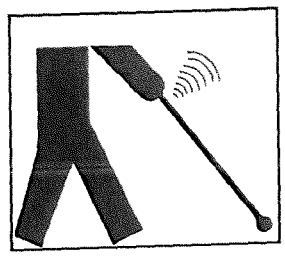
2

FIG.9

Fig.9A Tasten

| 3A*** | 3B*** |
|---|---|
| 2A*** | 2B*** |
| L1 | |
| 1A*** | 1B*** |

— 3
— — 7
— 3

Fig.9B Anschläge

| 3A | 3AB | 3B |
|---|---|---|
| 23A | | 23B |
| 2A | 13/L1 | 2B |
| 12A | | 12B |
| 1A | 1AB | 1B |

— 5
— 3 — 13
— 5

Fig.9C Zifferneingabe

| 1 | 5 | 6 | 7 | | |
|---|---|---|---|---|---|
| 2 | 4 | | 8 | | |
| 3 | 3 | 13/L1 | 9 | 0/10 | 11 |
| 4 | 2 | | 12 | | back |
| 5 | 1 | L2 | | | |

Bedienfunktionen
1: Start und Stop 13+1
Ziffern:
2: Start und Stop 13+3
Großbuchstaben:
3: Start und Stop 13+5
Rechner: 13+7
4: Kürzelprogrammierg.
5: 13+9
6: 13+11

Fig.9D Buchstabenkombinationen

| 00 Buchstaben | | | |
|---|---|---|---|
| 01 a | 31 | | 61 |
| 02 b | 32 ch | | 62 xxx |
| 03 c | 33 sch | | 63 xxx |
| 04 d | 34 qu | | 64 xxx |
| 05 e | 35 ich | | 65 xxx |
| 06 f | 36 du | | 66 xxx |
| 07 g | 37 er | | 67 xxx |
| 08 h | 38 sie | | 68 xxx |
| 09 i | 39 es | | 69 xxx |
| 10 j | 40 wir | | 70 xxx |
| 11 k | 41 ihr | | |
| 12 l | 42 euch | | |
| 13 m | 43 gern | | |
| 14 n | 44 mein | | |
| 15 o | 45 nein | | |
| 16 p | 46 sehr | | |
| 17 q | 47 xxx | | |
| 18 r | 48 xxx | | |
| 19 s | 49 xxx | | |
| 20 t | 50 xxx | | |
| 21 u | 51 xxx | | |
| 22 v | 52 xxx | | |
| 23 w | 53 xxx | | |
| 24 x | 54 xxx | | |
| 25 y | 55 xxx | | |
| 26 z | 56 xxx | | |
| 27 ä | 57 xxx | | |
| 28 ö | 58 xxx | | |
| 29 ü | 59 xxx | | |
| 30 ß | 60 xxx | | |

Fig.9E S+Sonderz.

| 71 | 72 , | 73 . | 74 : | 75 ; | 76 ! | 77 ? | 78 / | 79 ( | 80 ) | 81 * | 82 ^ | 83 ° | 84 & | 85 $ | 86 - | 87 + | 88 ' | 89 × | 90 ÷ | 91 % | 92 = | 93 < | 94 > | 95 # | 96 | | 97 | | 98 | | 99 |

EINFINGERTASTATUR JOE

METHOD FOR INPUTTING AND OUTPUTTING A TEXT CONSISTING OF CHARACTERS

CROSS-REFERENCE TO RELATED APPLICATIONS

This application is a National Stage application of International Application No. PCT/AT2018/000053, filed Jun. 7, 2018, which claims benefit to Austrian Application No. 242/2017, filed Jul. 7, 2017, which are incorporated by reference herein in their entireties.

BACKGROUND

Field

The present invention relates to machine writing, reading and communication of written texts, in particular to a method for inputting and outputting a text consisting of characters.

Description of the Related Art

The invention deals with novel methods and devices for simple and efficient writing, reading and written communication that do not ask too much of elderly people and, at the same time, with the transmission of tactile texts that anyone is able to read to make written texts accessible to blind, deaf-blind and deaf people as well as people with other disabilities.

The state of the art in relation to writing: currently texts are still written in uncontracted form, except for common abbreviations, so that there is a significant redundancy of unnecessary characters that could be avoided by using abbreviations. As texts are increasingly often written on small keyboards in an unergonomic way, efficient ten-finger typing is becoming less important, while the number of typos is on the increase. The state of the art in machine writing has thus reached a very low level.

The state of the art in relation to reading: shorthand is hardly used, although this would help to increase the reading rate. In particular if there not only words, but also text parts (etc.) were abbreviated; additionally, it would be possible to display a greater amount of short texts than of full texts on displays. Blind people who are only able to read texts letter by letter reading full texts is particularly cumbersome and tiring, while deaf people are not able to simultaneously read spoken texts that are converted into full text, because reading full text is much slower than the normal flow of speech.

There is a great need for innovation in the fields of writing, reading and written communication in general and a latent need for innovation in this field for people with disabilities.

SUMMARY

The task of the present invention thus consists in providing a method for accelerating inputting and reading texts, the level of difficulty of said method being freely variable, so that it is easy to learn the input method.

According to the invention, this is achieved by inputting and outputting the text in the form of a combination of full text and short text when it is input via an input unit and/or output via an output unit, the input and/or output short text containing at least one abbreviation in the form of characters or character combinations to which predefined full text contents have been allocated.

The full texts that are also referred to as uncontracted script or full characters and may include single- or multi-character characters, such as abbreviations including "etc.", "i.e.", "asap".

As the abbreviations are separated from the full text, abbreviations may also be single- or multi-character characters. They are used for retrieving full texts that are, for example, stored in keyboard files or on other devices that are connected to the keyboards. The abbreviations may be output, e.g., displayed, as short text contained in the full text together with the full text or used for retrieving text parts, sentences, words, phrases and standard texts. After the retrieval, the texts are available as full texts and can be output, e.g., displayed, as such.

When output in full texts, the written abbreviations are marked electronically, so that they can then be output as abbreviations. The output text will consist of full text and short text in this case.

A text may thus be input as a combination of full text and full text, e.g. via a keyboard, and may also be output in this form, e.g. for being checked, or a presentation may be converted into a text consisting of full text and short text using speech recognition software and may then be output in this form.

Additionally, a text available as a combination of full text and short text may be transmitted to a remote recipient and then be output, e.g., displayed, as a combination of full text and short text, e.g., on a display. This may be advantageous in cases in which the recipient knows the abbreviations used for the short text and is thus able to interpret them as full text content.

Before transmission, the text available as a combination of full text and short text may also first be converted into full text and then transmitted to a recipient, where it is either output as full text or re-converted into a combination of full text and short text using a set of abbreviations known to the recipient for outputting the short text sections.

Outputting a text in the form of a combination of full text and short text is particularly advantageous, as the user may achieve a very high reading rate in the course of time and as soon as they are familiar with the used abbreviations. The reading rate may be increasingly accelerated by using additional abbreviations, so that a hearing-impaired user may, for example, follow a presentation in real time by reading the output full and short texts, which allows them to read as fast as the flow of speech of the presentation without lagging behind and thus achieve complete understanding of what is being said.

Inputting texts as a combination of full text and short text is also advantageous as the use of abbreviations may be learned as required; users do not have to immediately master the complete set of abbreviations, but may combine an increasing number of abbreviations with full text over a longer period of time, so that every user's individual ability to learn can be taken into account and every user may individually determine the share of short text in relation to the share of full text. Previous inputting and outputting methods using short text always required the user to master the complete set of abbreviations at once.

As the abbreviations can be input and output independently of the full text, many abbreviations are available for retrieving full text contents; this is advantageous as the length of abbreviations depends on the number of available abbreviations and as short abbreviations are should be strived for. The use of other blank spaces (L2x) allows for a further increase of the number of abbreviations.

Outputting full text and short text according to the invention may reduce the time required for reading so that it becomes easier to follow a speech converted into text.

People without disabilities are able to read short texts faster, while deaf people may follow lectures in their entirety when they can be communicated fast enough in the form of full text in combination with converted short text; people with mental disabilities may use abbreviations to retrieve previously stored questions and answers and other texts.

Blind people are currently only able to read texts very slowly character by character, which means that the use of abbreviations is also advantageous for them.

The short text used reduces the number of characters and thus accelerates the writing rate, and the full texts retrieved via the abbreviations are output without typos.

Reading the short text in combination with the full text allows for faster reading and is thus advantageous for blind and deaf people. The texts output with abbreviations require less space on displays so that it is possible to either display more text or display the abbreviations in larger sizes. Additionally, it is also possible to use smaller displays for abbreviations.

Selectively using longhand and shorthand was not possible for shorthand writers, they had to learn all abbreviations beforehand. This has still not changed in the times of machine stenography, so that machine shorthand writers need two years of training in the US CAT system, for example.

The reason why the advantages of short text are still not used in this field is that, until now, users had to previously learn shorthand, which is no longer required for the method according to the invention, because users may learn the abbreviations while using them in a learning-by-doing approach.

Another embodiment of the invention may provide that the characters are input as combinations of numerical and/or alphanumeric characters, preferably two numbers of a keyboard.

In numerical writing systems, characters are written as two numbers, so that these 100 numbers (00 to 99) cover lower-case and upper-case letters, numbers themselves and almost all punctuation and special characters. For some characters, e.g., upper-case letters, other inputs can be provided so that the two-digit numbers may also be used for other purposes.

In this connection two-hand keyboards, one-hand keyboards and one-finger keyboards may be used for the implementation of the method of the invention. In case of two- and one-hand keyboards, characters are written using chord strokes. In case of one-finger keyboards, one finger can be used to press one or more adjacent keys together in combined key strokes.

In addition to real keyboard interfaces, any number of virtual keyboard interfaces (3D, like for upper-case letters on PC keyboards) that communicate with the real keyboard interface may be used on the keyboards. The virtual keyboard interfaces may also be used to write 100 numbers (00 to 99).

Another embodiment of the prevention may provide that the space bar (L1) is pressed after every word of the full text and that a predefined key (L2) is pressed after every abbreviation. The above keyboards may be used to write texts selectively as full texts or short texts (abbreviations), so that the status of an operating function is not changed when an abbreviation is inserted. Full text and short text are separated by pressing the conventional space bar (L1) after full texts (e.g., words) have been written and a predefined key, e.g. a novel space bar (L2), after an abbreviation has been written.

Inputting and/or outputting full text sections is indispensable, as proper names and foreign words for which no abbreviations exist are written. The abbreviations used in the frame of the present invention are predefined abbreviations from the respective language, e.g., standard abbreviations, as well as individual abbreviations used by the user who inputs and/or outputs or reads or takes in a text via tactile sensations.

When using inputs consisting of a combination of two numeric characters, numbers have to be written using two key strokes.

One advantage of numerical writing consists in the possibility of writing texts as full text and short text. Another advantage is that the two-digit numbers representing the characters can be learned very quickly and the 10 keys can be struck very quickly, as the distances between them to be covered by a finger are very small, and blindly.

As described above, the characters are written using chord strokes on two-hand and single-hand keyboards, while single-finger keyboards allow for two or more adjacent keys being pressed together using combined key strokes. Virtual keyboard interfaces can be used to expand their functions.

The keys used may be raised keys, touch-sensitive keys and combinations of raised keys and touch-sensitive keys. The keyboards may be separate (stand-alone) keyboards, keyboards that are wirelessly attached to other devices and keyboards integrated into other devices.

Two-hand keyboards can be compared to Braille keyboards for blind people; the keys are actuated with four fingers of each of the left and right hands and optionally by the thumbs. This mode allows for writing up to 256 Braille characters. They conform to the matrix of the Braille characters that comprises 8 Braille dots that may be raised and lowered piezo-electrically. The 8 dots can be used for 256 dot combinations.

Braille keyboards have proved very useful for writing Braille, as they can also be used as small and mobile Braille organizers.

Two-hand keyboards can also be used for writing Braille, but are mainly intended for universal use as separate devices, e.g., organizers, that can be used for various purposes. As mentioned above, they may also be used for writing full text and short text and for numerical writing where characters are represented by two numeric characters.

On single-hand keyboards, the keys are operated by the three middle fingers of each of the left and right hands, optionally also using the thumbs and the little fingers and chord strokes. They can be compared to single-hand Braille keyboards. They have the advantage that the second hand may be used for other tasks. They are thus handier than two-hand keyboards, but can still meet the high requirements of the present invention. They are also suited for numerical writing and for selectively using full characters and abbreviations.

On single-finger keyboards one finger of the left or right hand is used for individual or combined key strokes; due to their small size they are particularly suited for being used in connection with small devices (e.g., smart phones).

Another aspect of the invention may consist in outputting the input characters via a tactile device, which allows for writing texts and checking them based on the tactile information.

Braille, the alphabet used by blind people, is the only alphabet for blind people that is used worldwide; reading the embossed braille dots that may be raised and lowered is very difficult, so that only 5% of all blind people actually read Braille. Most of them thus use Braille keyboards with artificial speech output. This has, however, not helped to solve the problem in the way that had been hoped for, as speech output even promotes illiteracy among blind people.

As no solution was found for Braille, the inventors have developed a novel method. This method automatically converts real characters (or abbreviations) written using the above-described keys in virtual characters and outputs tactile information as short vibrations on the writer's (recipient's) body. The writer knows the vibrations that convey the characters (or abbreviations) and may thus check themselves whether the output corresponds to the input. If this is not the case, the only reason is a false key stroke.

As information is conveyed to the writer (=recipient) in a tactile way, it is accessible for all people.

Deaf-blind people also use Braille and, additionally, the Lorm alphabet. In the case of the Lorm alphabet, the writer uses their finger to write dots and lines at predefined positions onto the hand and fingers of the deaf-blind recipient.

Existing texts are made readable by inputting the characters or abbreviations to be read using our keyboards and making them readable using the method of the invention. This means that input real characters are converted into virtual characters or abbreviations and output to the recipient on their body using vibrations; it is not possible to self-check, as the output characters can only correspond to the input characters.

The texts to be read may also be characters that the blind or deaf-blind recipient may have received in emails or via messenger services, such as Skype, WhatsApp, etc. The finger-to-hand communication using the Lorm alphabet would then become obsolete, as deaf-blind people can receive and read characters (abbreviations) written by others and also write texts themselves.

As it is also possible to convey abbreviations, the reading rate can be significantly accelerated. If the recipient receives abbreviations that they have not yet used themselves, it is also possible to output them as full text or convert them into or output them as known abbreviations.

The reader determines the output rate themselves. It can be arbitrarily changed, and the output may also be stopped. The method of tactile writing and reading according to the invention may be used for textual skyping when adapted accordingly. This allows several people, including deaf-blind people, to participate in a communication.

Worldwide, there are more deaf people than blind people; blind people probably also would not want to be in the position of deaf people, as many of them also experience problems speaking. For these and other people with a speaking impairment, writing and reading fast with the help of abbreviations plays a very important role, as information conveyed by means of sign language is often insufficient.

Example-1: At certain events, sign language interpreters are employed, although this would not be necessary if the spoken texts were converted by means of speech recognition and simultaneously output as a combination of full text and short text by means of the method of the invention, ideally on the deaf person's smart phone or at major events on several large visual displays using various abbreviation levels, so that persons who do not know that many abbreviations may also follow the speaker's statement.

Example-2: Communication between a deaf person and their partner without disability.

The deaf person writes their text on their keyboard using abbreviations, the text is output on the screen of their smartphone in full text, so that their partner without disability is able to read the text.

The partner then responds verbally, the deaf person's smart phone uses speech recognition to convert the spoken text into text and the deaf person's individual shorthand, and the text is then output on the deaf person's smart phone as a combination of full text and short text, so that the deaf person can read it.

Example-3: Texts output on TV are conveyed to a deaf person by having them converted using speech recognition on the deaf person's smart phone and outputting them in the deaf recipient's individual shorthand.

According to another embodiment of the invention, characters of a set of characters may be used for inputting and outputting a readable text, said characters being input via a keyboard with a plurality of keys, the characters or character combinations being buffered and/or transmitted between input and output, and the characters may selectively be input as full text or short text, so that full and short text sections are input alternatingly, abbreviations in the form of characters or character combinations that may be selected via an allocated character combination being defined for inputting the short text sections.

Short text sections may be used in combination with full text sections, the share of short text sections as compared to the share of full text sections being freely selected by the user according to their needs and knowledge of the definitions of abbreviations, so that the input rate can be increased individually.

The combined text consisting of full text sections and short text sections may be output as full text with short text or as full text after having retrieved the definitions of the abbreviations and having converted the short text sections into full text sections.

According to a further aspect of the invention, each of the full text sections may comprise one or more of the following: characters of the set of characters, syllables, words, phrases, standard texts or textual information.

Each of the short text sections may comprise abbreviations for retrieving stored full texts.

According to another variation, the input characters may be output via a tactile device; the characters that are input in the form of full text and short text may also be output as a combination of full text and short text via the tactile device, e.g., a belt or strap with an integrated matrix of oscillation actuators that can be mounted to the body of a user.

The characters that are input may be output via a tactile device to check them for correctness or correct them and may additionally be buffered, or the input characters may be output via a tactile device to check them for correctness or correct them and may additionally be converted into full text and speech.

A suitable tactile device may be used to provide actuators that convert the characters of a text into physical stimuli in at least four different positions on a human body.

The actuators may be formed by at least four electrical oscillators that may be arranged as part of a belt and may be brought into contact with the human body.

Additionally, another embodiment of the invention may provide bidirectional communication in the course of which full text entered via a keyboard is converted into speech and the verbal response is output as full text and short text.

The definitions used for input or other definitions of abbreviations may be used for outputting the short texts.

BRIEF DESCRIPTION OF THE DRAWINGS

Without limiting the general nature of the inventive idea, the invention will be explained in further detail below referring to the exemplary embodiments illustrated in the drawings in which:

FIGS. 3A1, 3A2 and 3A2b show schematic embodiments of a tactile output device;

FIGS. 3A3 and 3A4 are partial depictions of a user's hand holding keyboards;

FIG. 4A1, 4A2, 4A3 show various hierarchy structures of character sets;

FIGS. 6A, 6B, 6C and 6D show schematic views of further keyboards;

FIG. 7A shows a schematic view of another embodiment of a tactile device;

FIG. 9 shows the key allocations for a keyboard according to FIG. 8;

DETAILED DESCRIPTION

Figure 1A:
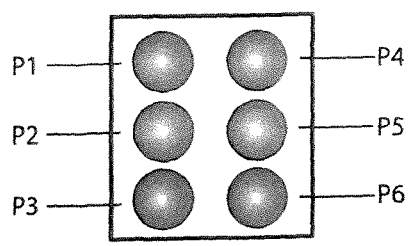
FIG. 1A and FIG. 1B show schematic representations of Braille matrices according to the state of the art.

The invention relates to novel devices and methods of machine writing and virtual reading of volatile tactile characters and acoustic sounds. The devices and methods of the invention can be used individually, together or in combination with any other devices.

Novel writing: The devices are single-hand keyboards (ET) that allow for the second hand to be used for other tasks. The ETs may be used: (i) for writing alphanumeric characters, (ii) for writing numeric characters, the numerical retrieval of alphanumeric characters, words and other textual units and (iii) as hybrid keyboards for writing in the two modes (i) and (ii) and, additionally, (iv) for various purposes, e.g., as consoles for operating other devices or for making music. The ET are miniature and subminiature keyboards that can be operated blindly.

Texts may be selectively written and output as full texts and short texts, or they may, for example, be converted into full text before being output, the abbreviations contained in the short text being used as codes for retrieving stored textual information in this case.

The characters may be mainly written using chord or combined key strokes in order to minimize the number of keys, keeping the distances to be covered by the fingers as short as possible and allowing for easy touch-typing.

Several optional writing simplification measures may be used as a support for inputting text.

Virtual reading: The written or scanned characters, words and other text units follow a hierarchical structure; at each level of this hierarchy partial information concerning the input is output sequentially, e.g., in a tactile way, using volatile stimuli or sounds. This allows the user to know which text units they have input already while they are still writing and also how these text units are virtually output after having passed through the hierarchy.

Virtual reading can be useful to check the written characters for correctness, to read any texts written by others, for written communication with other people and for automatically receiving important messages. The same output procedure may also be used for manually retrieving measurement results of automatic and operated devices.

Virtual reading may replace Braille and may be even displays. As written codes can also be read as such, very fast writing and reading rates can be achieved, as offered by manual stenography more than 100 years ago, with the additional advantage that the characters may now be automatically written, copied as digital units, expanded and checked for their correctness during input.

Machine writing has been dominant for many years, because writing by hand is strenuous, handwriting is often not easy to decipher nor digitalized. There are, however, still many, mainly elderly, people who do not or can not use machine writing for various reasons; there is also a trend towards ever smaller mobile writing devices that reduces the importance of writing on conventional PC keyboards and of the efficient ten-finger typing.

Single-hand keyboards offer the advantage that the second free hand may be used for other tasks. Single-hand keyboards have been available for a long time, but have not become established so far, so that they are mostly used by people with writing impairments. Stenography machines are available in some countries, e.g., the US CAT system. These machines are only used by professional stenographers.

Blind and deaf-blind people and those with severe visual impairments, collectively referred to as blind people below, are mostly good at writing on PCs and Braille keyboards, if they know Braille, which, however, the majority of blind people does not.

Figure 1B:
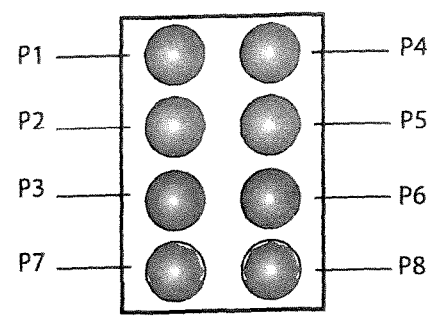

The Braille alphabet developed by Louis Braille (1809-1852) is the only alphabet that is used by blind people around the world. It has provided blind people with access to written information. The characters are represented by 6 or 8 dots on a matrix. The dots have a diameter of approx. 1.2 mm. The distances between the dots amount to 2.5 mm, the distance between individual matrices amounts to 3.5 mm. 6-dot Braille (FIG. 1A) can be used for different dot combinations, while 8-dot Braille (FIG. 1B) allows for 256 different combinations.

When reading, blind people use their reading finger to move over the embossed dots.

Figure 1C:
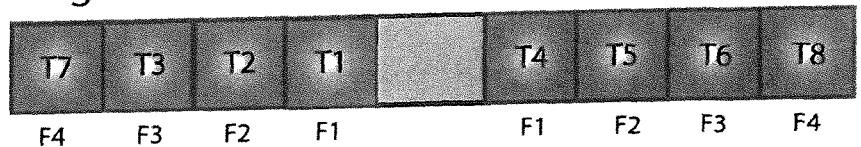
FIG. 1C and FIG. 1D show top views of Braille keyboards and a Braille line according to the state of the art.

The keys of the Braille keyboard are arranged horizontally and one key is provided for each finger. According to the drawing (FIG. 1C), the four dots (T7-T3-T2-T1) are operated by chord strokes using the fingers of the left hand and the four dots (T4-T5-T6-T8) are operated by chord strokes using the fingers of the right hand. The keys of mechanical keyboards emboss the dots into the backside of a Braille paper when pressed.

Figure 1D:
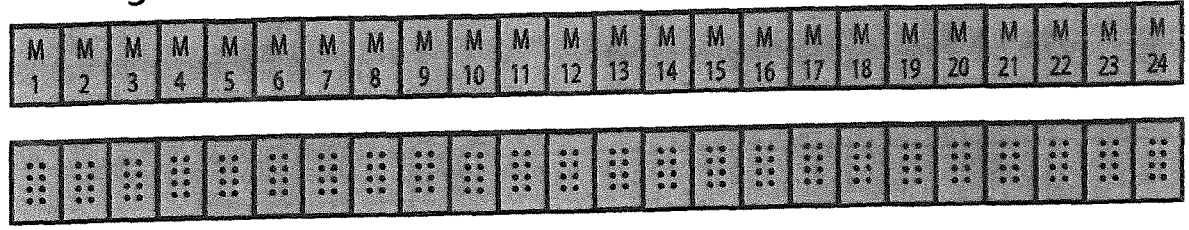

Electronic Braille organizer mostly have tactile displays (Braille characters) for read-after-write checking using a finger. The drawing (FIG. 1D) shows 24 Braille modules (M1-M24) next to each other on a Braille line. The dots may be raised and lowered piezo-electrically. Large Braille lines comprise 80 modules, while Braille organizer mostly comprise 20 to 22 modules. There are PCs equipped with speech output, a Braille display (including 80 modules), a Braille printer and a display reading software for operating the mouse. This equipment is very expensive; it is, however, sponsored by authorities if it is needed for professional purposes.

The use of Braille has been on the decrease for a long time, so that the alphabet is only used by 5% of all blind people. This is why, on the occasion of Louis Braille's 200$^{th}$ birthday, 500 participants of the UNESCO conference in Paris in 2009 from all over the world vowed to promote Braille more than before, as there is a serious risk that blind people are illiterate that cannot be prevented by artificial speech output. This measure was, however, not successful in reverting this trend.

The alphabet invented by William Moon (1818-1894) is used in some Commonwealth countries. The characters are based on the handwritten characters of seeing people, which makes it easier to recognize them haptically than Braille characters. Moon characters can also be printed using Braille printers.

Most blind people know the alphanumeric characters that seeing people use, as they can sense and read them with their fingers when embossed lines are printed as dotted lines.

The characters of the Lorm alphabet for deaf-blind people developed by Hieronymus Lorm (1821-1912) are brushed and tapped onto a hand of a deaf-blind person. This way of conveying information is very cumbersome and not very progressive. Every attempt of finding a modern solution for the Lorm alphabet have remained unsuccessful so far.

The present invention deals with making writing and reading accessible to everyone using tactile devices and methods for blind people. As everyone has a haptic sense, our inventions are not limited to the minority of blind people, but intended for comprehensive universal use that also includes as many people with disabilities as possible.

Figure 2A:
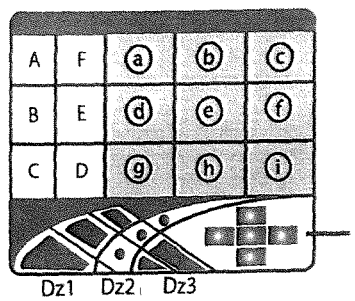
FIG. 2A shows a schematic top view of a single-hand keyboard according to an exemplary embodiment of the invention.

In addition to single key strokes, the new single-hand keyboards provide for chord and combined key strokes. FIG. 2A shows such a chord keyboard for the three middle fingers of a hand on which it is also possible to carry out cross-line strokes, including a simultaneous stroke of the keys (d+b) using the forefinger and the ring finger, for example.

The thumb is the most versatile and strongest finger of the hand. On PC keyboards, the thumbs are used for pressing the space key when writing with ten fingers, so that the huge potential of the thumbs cannot be tapped. Single-hand keyboards allow for the thumbs to make a wide pivoting movement. The thumb may thus cover a huge area of an arched thumb line (Dz) on which several keys may be arranged. The thumb may also strike the shift key and carry out chord strokes at the same time as striking other keys.

The keyboard according to FIG. 2A is an alphanumeric keyboard (ETA) which can be used to write alphanumeric characters.

Figure 2B:
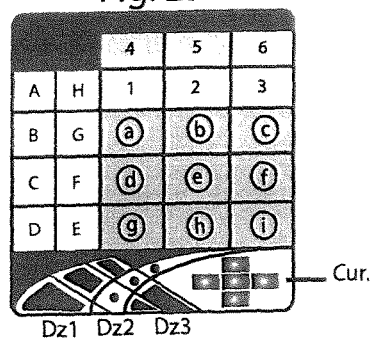
FIG. 2B shows a schematic top view of another single-hand keyboard according to another exemplary embodiment of the invention.

FIG. 2B shows a hybrid keyboard (ETY) that can be used to write alphanumeric numerical characters together. [a+1] may, for example, be used to write the German word "aber" (but), while [a+2] can be used to write the German word "außerdem" (moreover).

According to the invention, abbreviations have been allocated to the key combinations a+1 and a+2 that can be used to retrieve words, text passages, etc.

SUPPORT KEYS: Support keys are keys, including the keys (ABCDEF), for example, of the keyboard (FIG. 2A) that may be used individually or in combination.

JOKER KEYS: Joker keys are keys (not shown) that can be used for several purposes depending on the respective function and program.

Figure 2C:
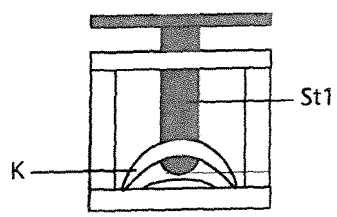
FIG. 2C to 2J each show a top view of known key types.

CONVENTIONAL RAISED KEYS (Ht): The raised keys correspond to the common individual keys that can be embodied in different ways. FIG. 2C shows a "click key" (K) that pushes the stamp (St1) upwards.

Figure 2D:
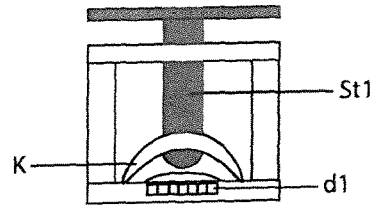

SPECIAL RAISED KEYS (Hs): These keys are special raised keys (Hs) that can be used to write two or more different characters by varying the key stroke. FIG. 2D shows a special raised key (Hs) that is also equipped with a "click key" (K). There is a pressure sensor (d1) on the lower end of the stamp (St1). This allows for writing come characters using ordinary key strokes and other characters when pressing the keys for a longer time.

Figure 2E:
Figure 2F:
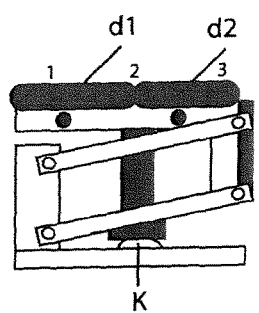
Figure 2G:
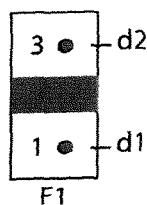
Figure 2H:
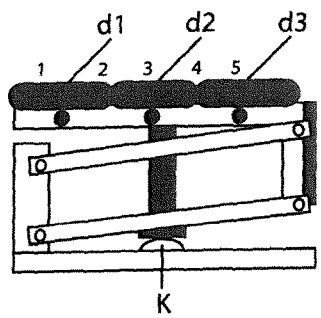
Figure 2I:
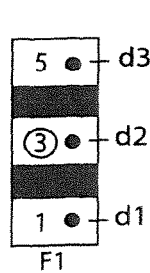
Figure 2J:
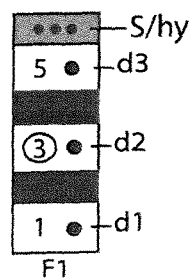

SENSOR KEYS (S): These keys are capacitive sensors that are activated when they are touched, like the keys of touch screens, for example. The keyboards in FIG. 2E and FIG. 2J show such sensor keys with three dots. In both cases, they acre marked with (S/hy) as they may be used both, in combination with the adjacent raised key (ht) or as a hybrid key (hy).

Figure 4A1:
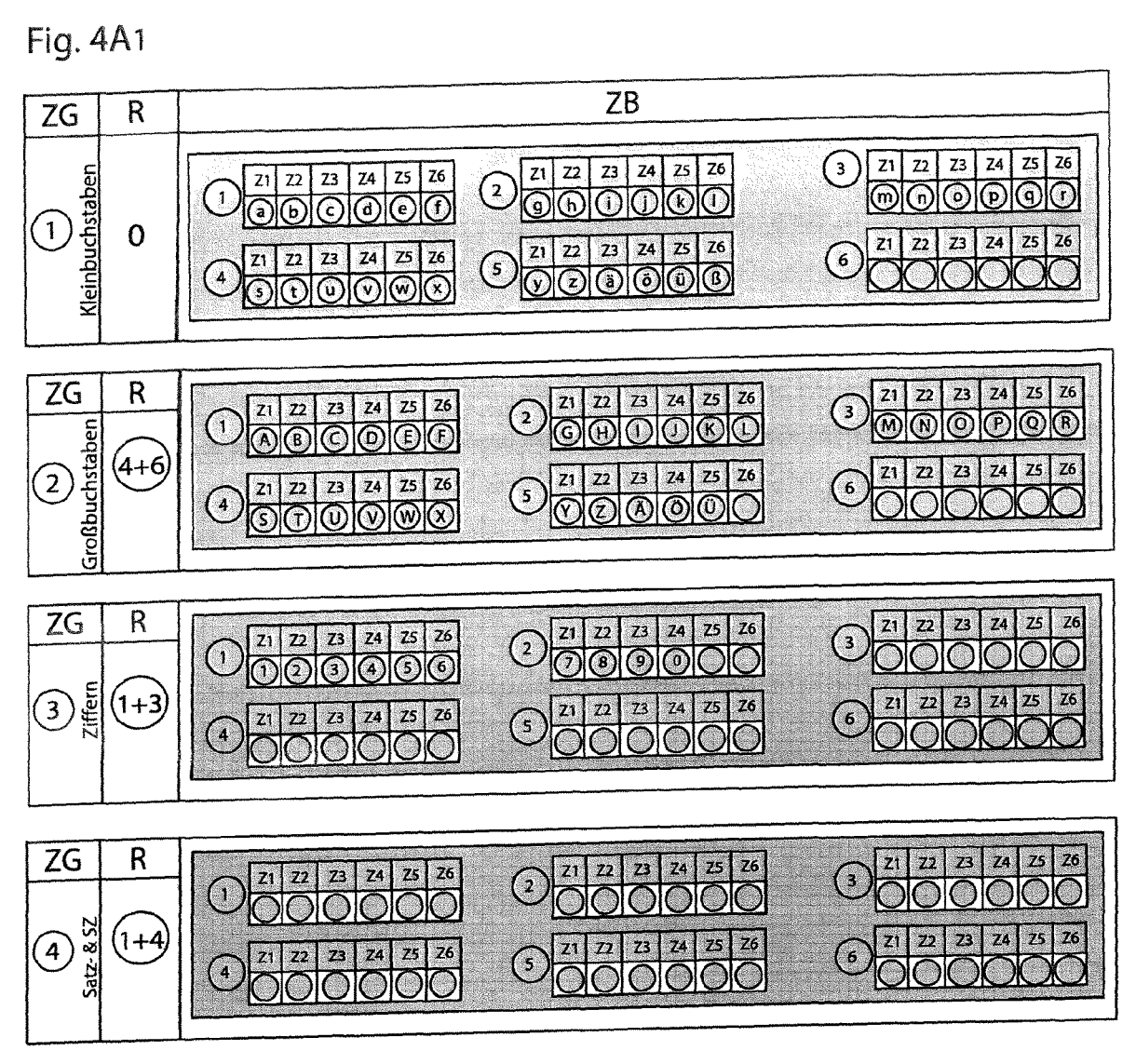
Figure 4A2:
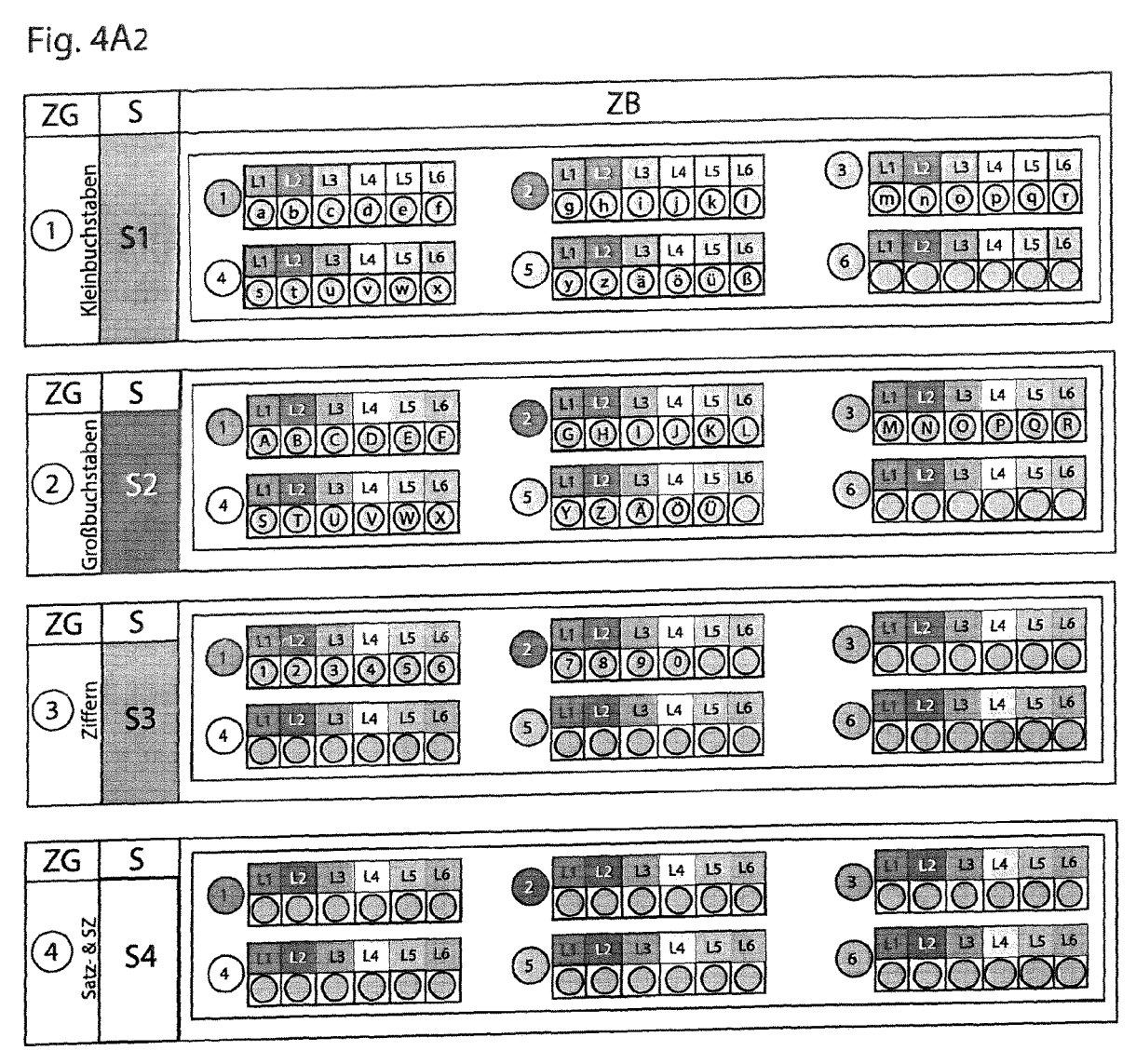
Figure 4B:
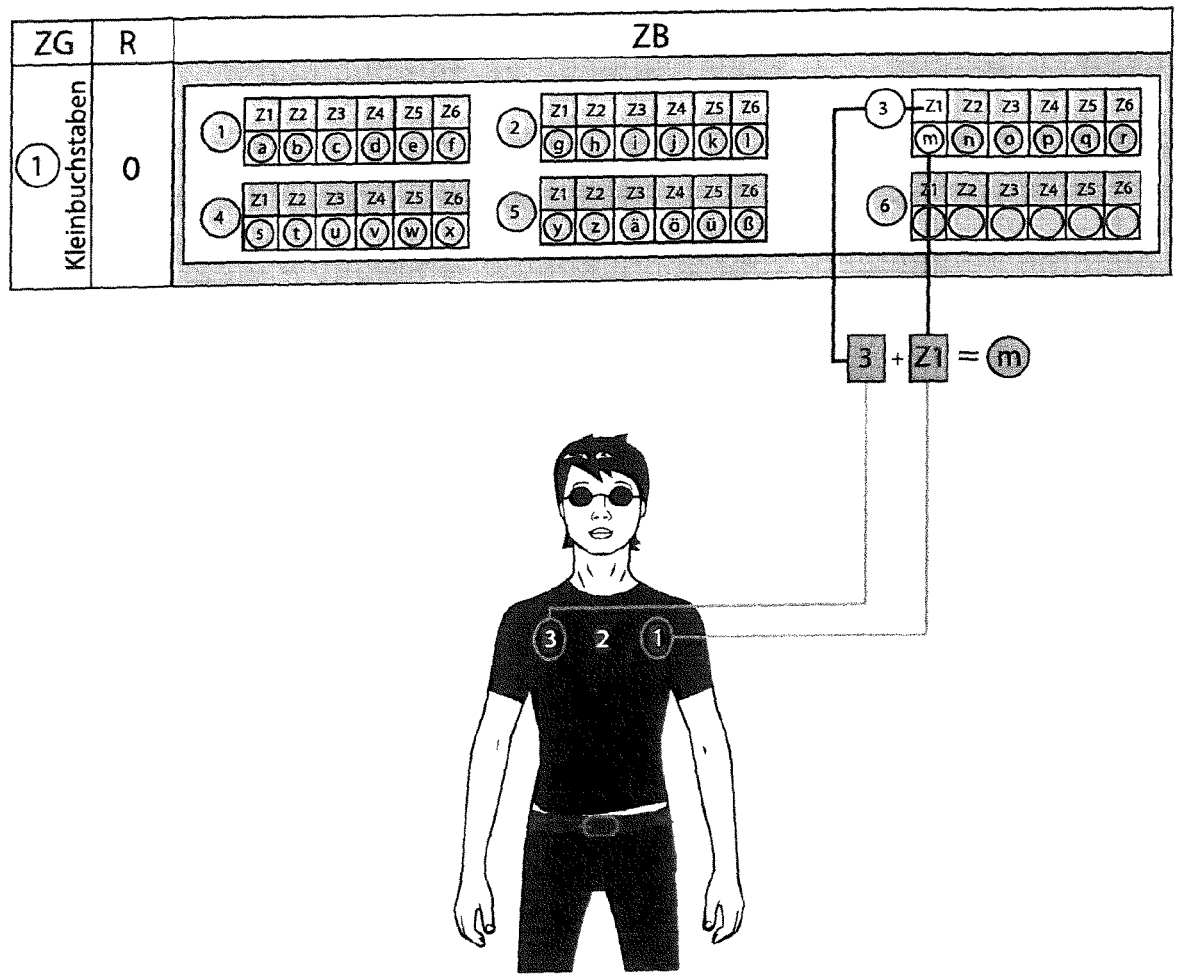
FIG. 4B shows a scheme for pressing keys of a keyboard according to FIG. 5G.

HYBRID KEYS (hy): The hybrid keys (hy) are combinations of conventional raised keys (Hat) and sensor keys (S). At first, the raised key is pressed with continued pressure, then the sensor key (S) is pressed. Example: The drawing in FIG. 4C shows the letters "a-c" in the middle column. The adjacent sensor key (S) can be pressed on its own. If the keys "a" and (S) are pressed, this would rather correspond to the hybrid stroke (hy).

ET COLLECTIVE KEYS: These keys are longitudinal keys with pressure sensors that have the advantage that their vertical length may be shorter.

COLLECTIVE KEY WITH THREE LINES: FIG. 2F shows a collective key with two pressure sensors (d1, d2) in a side view and in a top view (FIG. 2G). If the pressure exerted on (d1) is larger, the stroke is a stroke on line (1); if the pressure measured by the pressure sensor (d2) is the highest, the stroke is a stroke on the third line (3); if the pressure is distributed equally, the stroke is a stroke on the virtual line (2).

KEYS WITH FIVE LINES (FIG. 2H and FIG. 2I): Like the collective keys but for 5 strokes. The version of FIG. 2J even provides for 7 strokes.

Figure 2K:
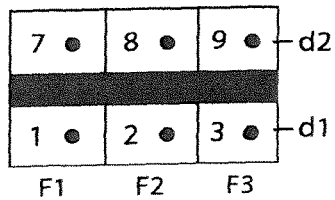
FIGS. 2K and 2L each show a top view of known global keys.
Figure 2L:
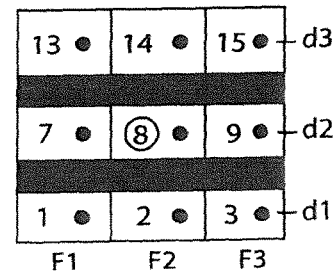

ET GLOBAL KEYS: The drawing (FIG. 2K) shows a top view of the global key for the three middle fingers of a hand (F1-F2-F3) with three lines. The drawing (FIG. 2L) shows a global key with five lines. Global keys are heavier than single keys, so that levers are provided. The keys of the global keys may also be pressed horizontally (using chord strokes), simultaneously pressing several keys.

The single-hand keyboards of the present invention are alphanumeric keyboards (ETA) and numerical keyboards (ETN) as well as hybrid keyboards (ETY) that combine ETA and ETN keyboards. There are also keyboards for various specific purposes (ED).

THE ALPHABETIC KEYBOARDS ETA: These keyboards include keyboards with alphanumeric subminiature keys that are actuated using one finger (ETA1), alphanumeric three-finger keyboards (ETA2) that can be operated using chord strokes and pocket keyboards that can be operated using a single finger (ETA3).

SINGLE-FINGER KEYBOARDS ETA1: These keyboards are subminiature keyboards whose keys are arranged in clusters or linearly; adjacent keys may also be struck (pressed) simultaneously using a single finger. These keyboards only allow for a few key strokes, but they can be expanded using shift key strokes and support and thumb keys. This means that they cover all characters of the set of characters if two strokes are provided for each character. The offer the advantage that they can be embodied in very small sizes and fixed to a forearm like watch to be operated using one finger of the other hand.

Figure 5A:
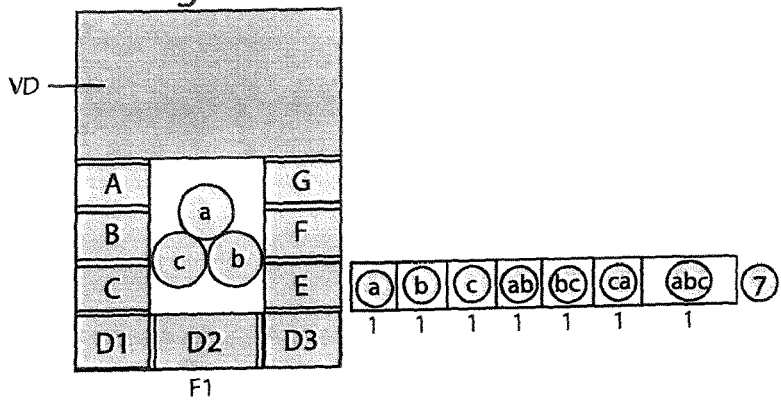
FIGS. 5A, 5B, 5C and 5D each show a top view of keys arranged in a cluster and key combinations illustrated next to them.
Figure 5B:
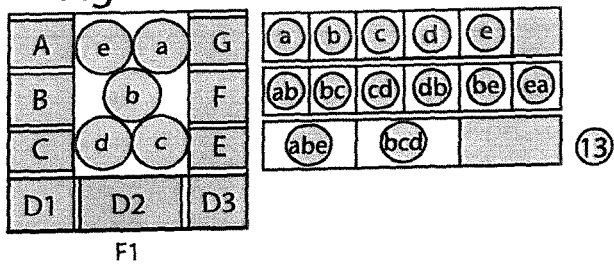

KEYS ARRANGED IN CLUSTERS: The keyboards of FIGS. 5A and 5B are examples of keyboards with character keys that are arranged in clusters. There are support keys and thumb keys (D1-D3) on the left- and right-hand side and below them. The keyboard in FIG. 5A allows for 7 strokes, while the keyboard in FIG. 5B allows for 13 strokes.

Figure 5C:
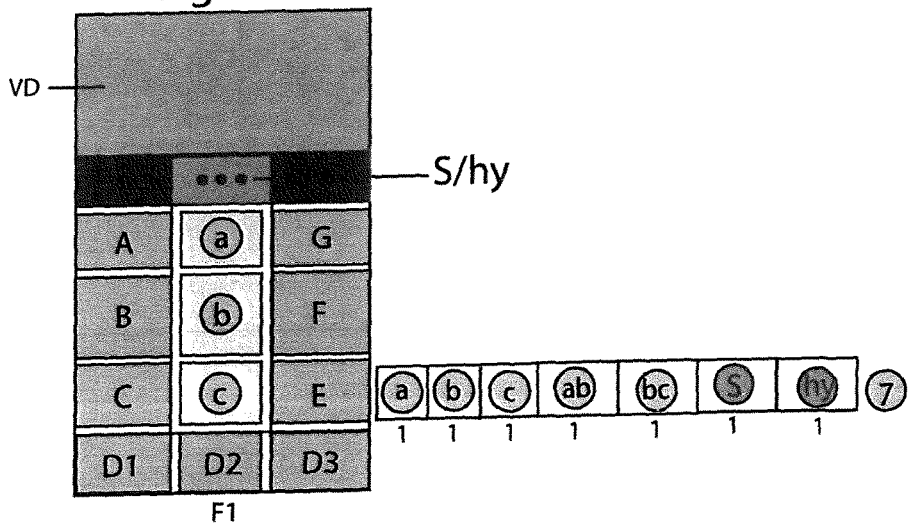
Figure 5D:
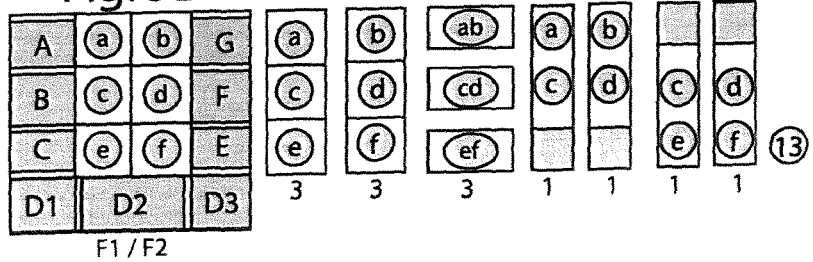
Figure 5E:
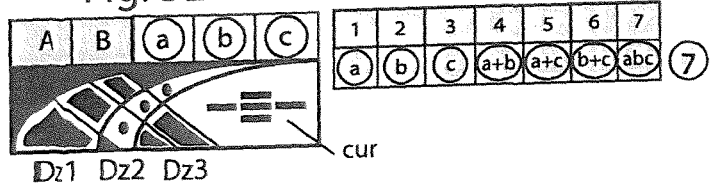
FIG. 5E, 5F, 5G each show a top view of three-finger keyboards and key combinations illustrated next to them.

LINEARLY ARRANGED KEYS: The character keys of the keyboards of FIG. 5C and FIG. 5D are arranged linearly. The keyboard in FIG. 5C allows for 7 strokes, as the sensor key (S) may be used as a hybrid key in combination with the character key "a". The keyboard in FIG. 5D has two vertical columns that may be operated using a forefinger and a middle finger or the fore finger alone.

Figure 5F:
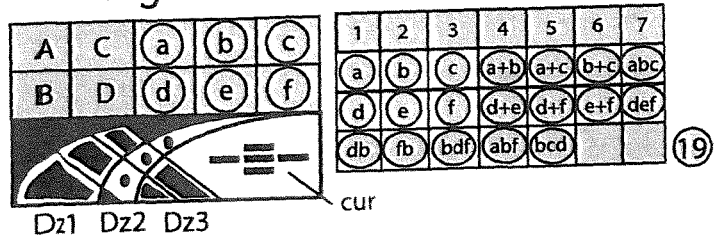

THREE-FINGER KEYBOARDS ETA2: The keys of these keyboards are pressed by chord strokes of the three middle fingers, also across the lines. These keyboards are larger than the ETA1 keyboards, but still small. As each finger only presses one key, writing requires less force than writing on single-finger keyboards (4, 11). These keyboards also offer significantly more potential stroke combinations than ETA1 keyboards and are thus able to cover all the characters of the set of characters. The keyboards according to 5E allow for writing 7 characters, those according to FIG. 5F allow for writing 19 characters and those according to FIG. 5G allow for writing 31 characters; the keyboard in FIG. 5H corresponds to the keyboard according to FIG. 5G that has been mounted to a forearm.

ETA3 KEYBOARDS: On these keyboards, characters may be written by individual or combined key strokes using one finger or a thumb. Their shape can be compared to smart phones. Their keys are arranged in a ring- or chain-like shape, so that adjacent keys may be pressed together.

Figure 5G:
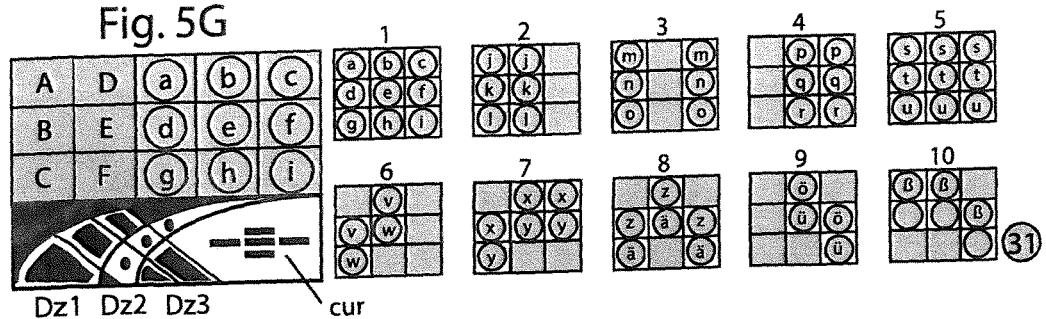
Figure 5H:
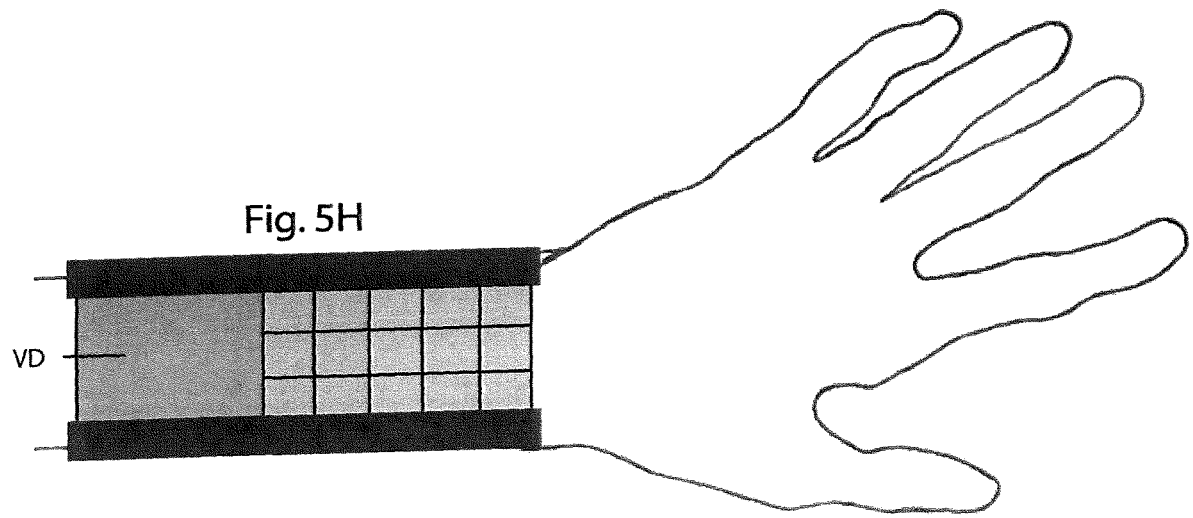
FIG. 5H shows a top view of a three-finger keyboard according to FIG. 5G mounted to a forearm.

JONNY KEYBOARD: According to the drawing (FIG. 5I), this keyboard allows for 73 individual and combined key strokes. This means that they do not cover the entire set of characters, but there are certain expansion options that may be used. The drawing FIG. 5J shows the keyboard mounted to a forearm.

COMMON KEYBOARD: The drawings according to FIG. 5K show the common Jonny-John keyboard that may also be operated with a thumb (FIG. 5L) and are similar to some mobile phones. The strokes are single strokes, while mobile phone keyboards require to carry out an average of 2.4 strokes per character. The strokes on the Jonny keyboard (A)

Figure 5I:
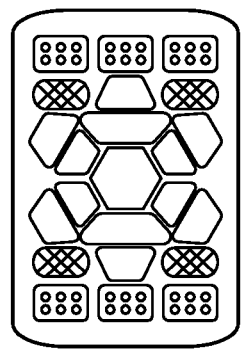
FIGS. 5I and 5J each show a top view of another keyboard embodiment.
Figure 5J:
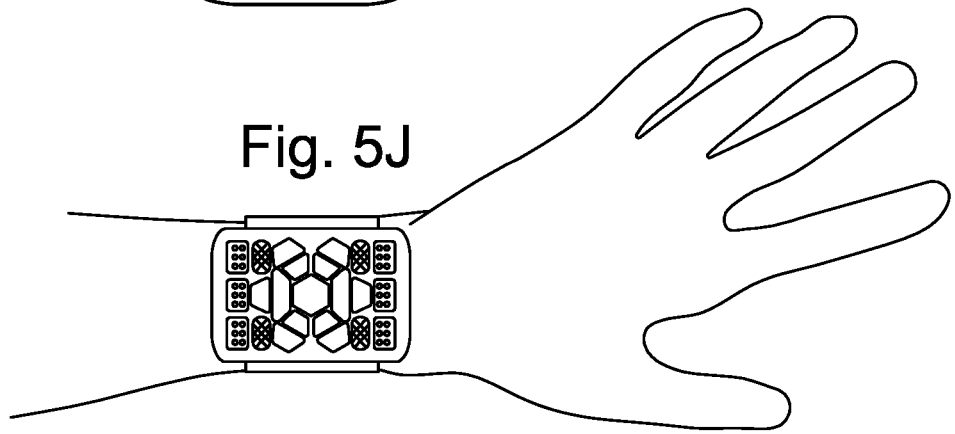
Figure 5K:
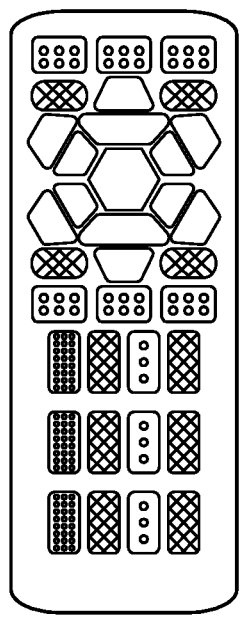
FIGS. 5K and 5L each show a top view of another keyboard embodiment.
Figure 5L:
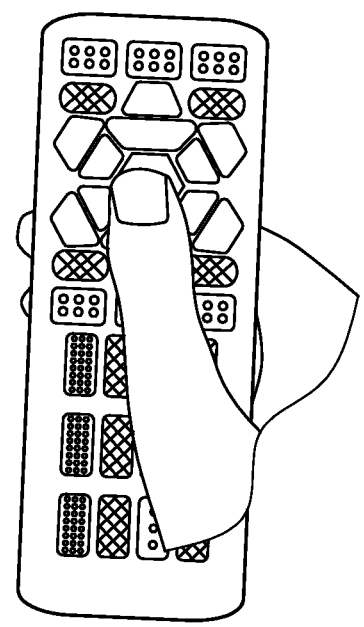

The characters on the Jonny keyboard (A) are written like those in FIG. 5I, while the John keyboard (C) allows for chord strokes using the three middle fingers of a hand. The advantage of the common keyboard is that its capacity is always allocated to the keyboard that is activated; another advantage is that this allows for covering the entire set of characters.

Figure 5M:
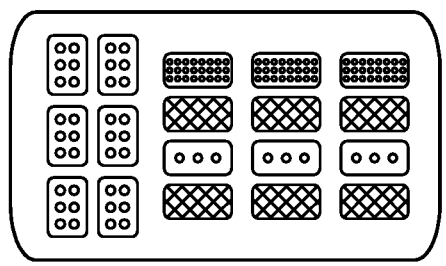
FIGS. 5M, 5N and 5O each show a top view of another keyboard embodiment.
Figure 5N:
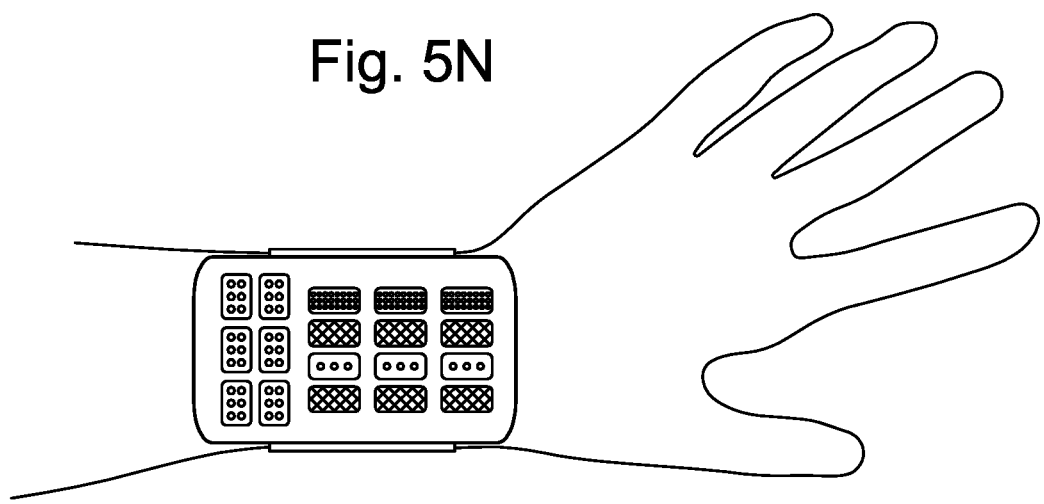
Figure 5O:
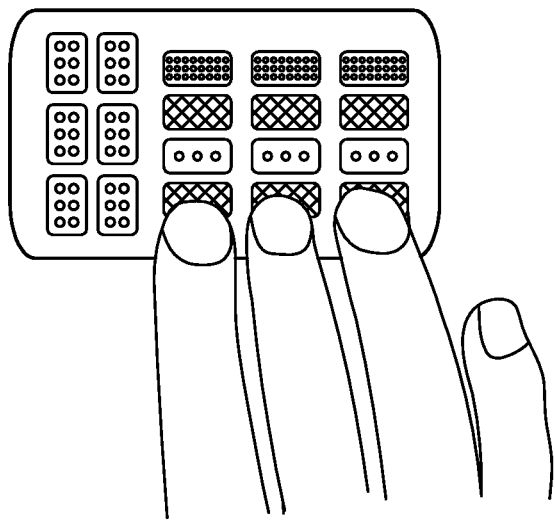
Figure 5I:
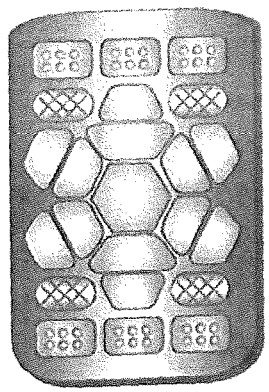
Figure 5J:
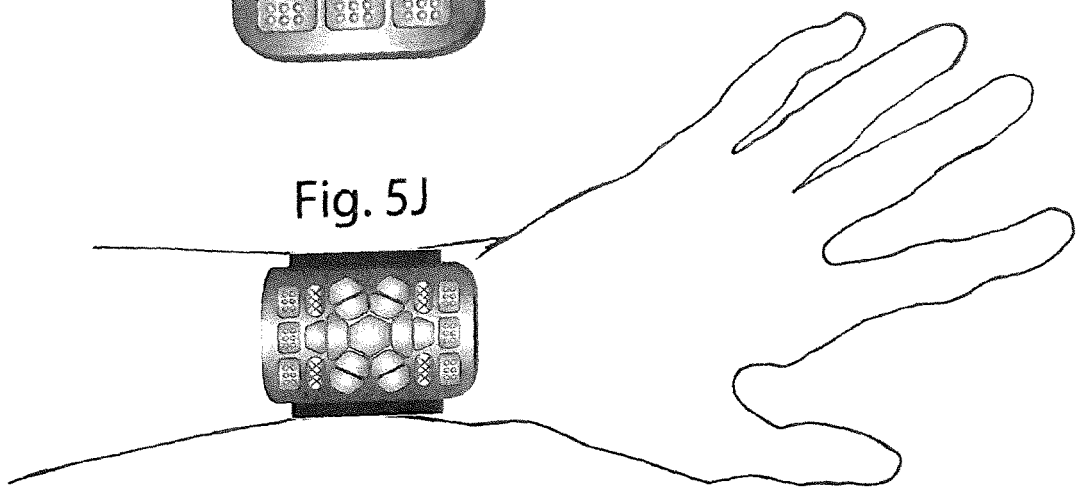
Figure 5K:
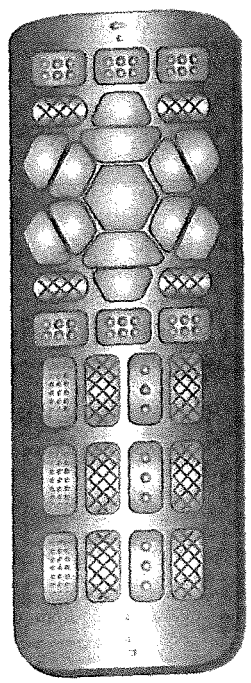
Figure 5L:
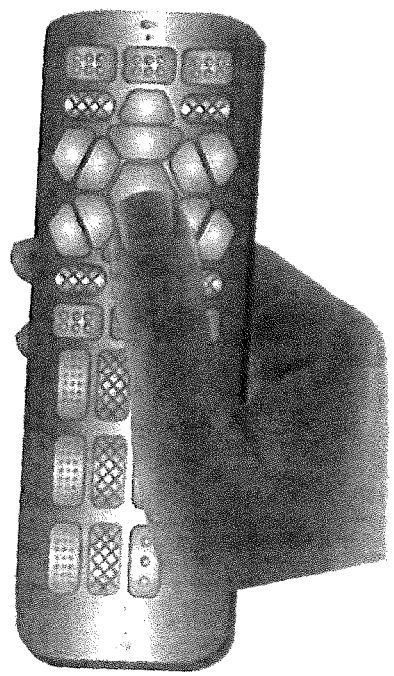
Figure 5M:
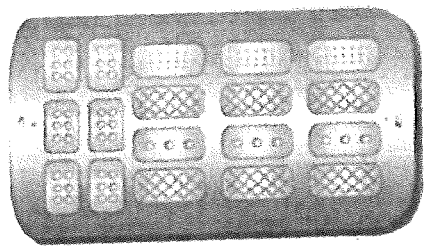
Figure 5N:
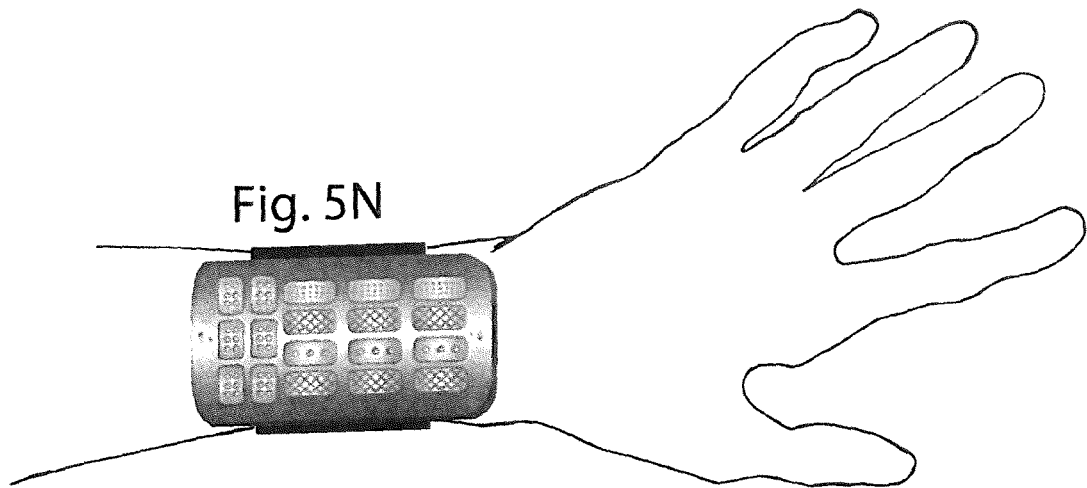
Figure 5O:
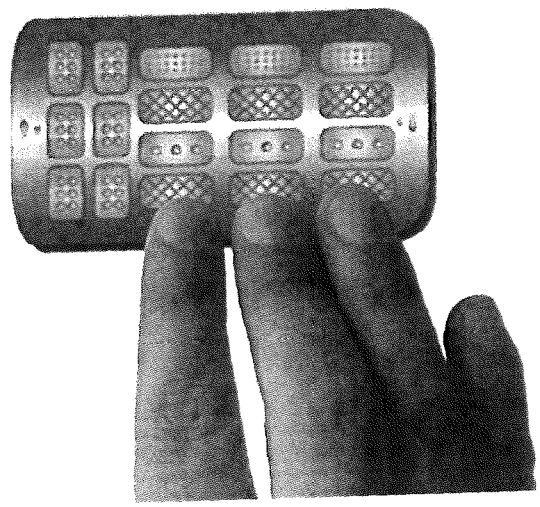

THE JOHN KEYBOARD: The drawing according to FIG. 5M, 5N, 5O show the John keyboard on which keys are operated using the three middle fingers of a hand. The drawing in FIG. 5N shows the keyboard mounted to a forearm; the drawing (FIG. 5O) shows a keyboard with ten keys, consisting of four lines and three columns and control keys.

The ETN keyboards are numerical subminiature keyboards which allow for retrieving characters, syllables, words and any other text units using two-digit numbers.

Figure 6A:
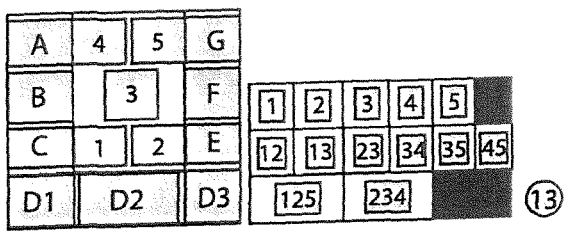

The drawing according to FIG. 6A shows a subminiature version of the ETN keyboard that is similar to the alphabetic keyboard according to FIG. 5B. This keyboard, however, allows for writing 13 numbers; double key strokes allow for 169 combinations (13×13). These combinations cover the entire set of characters. Output is retrieved automatically after the second key stroke. The first stroke, the second stroke and both strokes may be expanded by shift strokes.

ADVANTAGES AND DISADVANTAGES OF ETN KEYBOARDS: Characters are retrieved after double strokes; learning the numbers by which the characters can be retrieved is very easy. The keys may be embodied in very small sizes, and all strokes may be carried out very fast and blindly from a single central position, the distances to be covered by the fingers being very small. These advantages may compensate the disadvantages of double key strokes and turn them into advantages if they are used for inputting codes.

The Hybrid Keyboards ETY

Figure 6B:
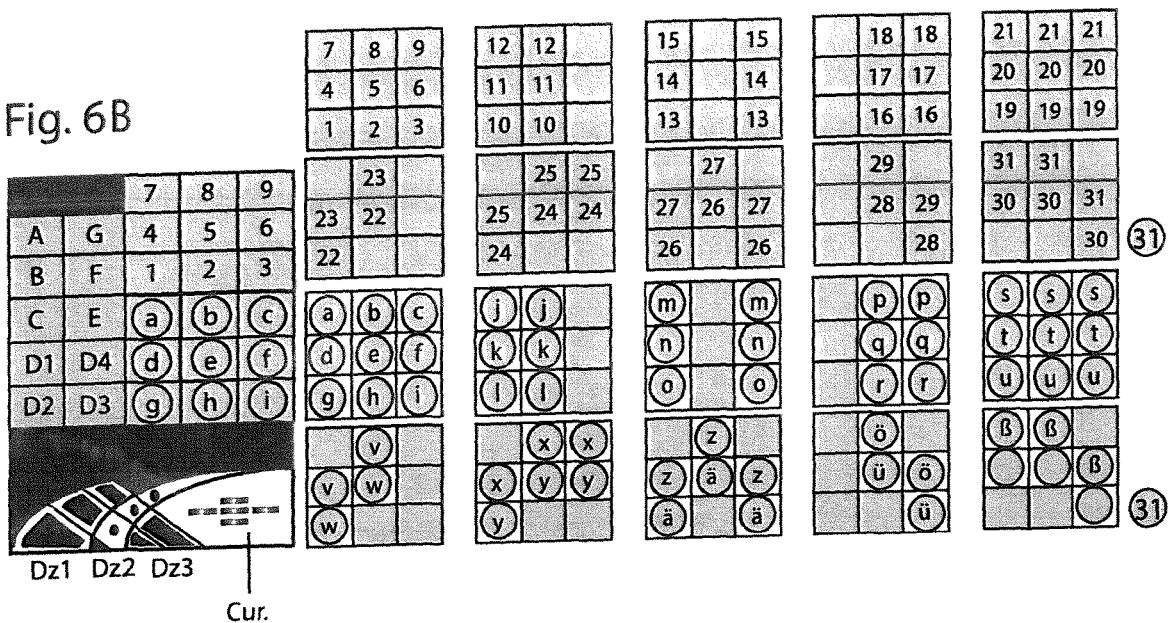

FIG. 6B shows an ETY keyboard with three lines and three columns, the alphabetic unit being comparable to the keyboard in FIG. 5G. Both can be used to write 31 characters using chord strokes.

The two keyboards can be used individually or in combination. Combining them allows for an enormous expansion of potential strokes; when letters and numerical characters are combined, the number of combinations amounts to 961 (31×31).

VARIOUS ETD KEYBOARDS: ETD keyboards are keyboards that can be used for various purposes, e.g., as remote controls, consoles for operating and controlling other devices and games, music output, etc.

Figure 6C:
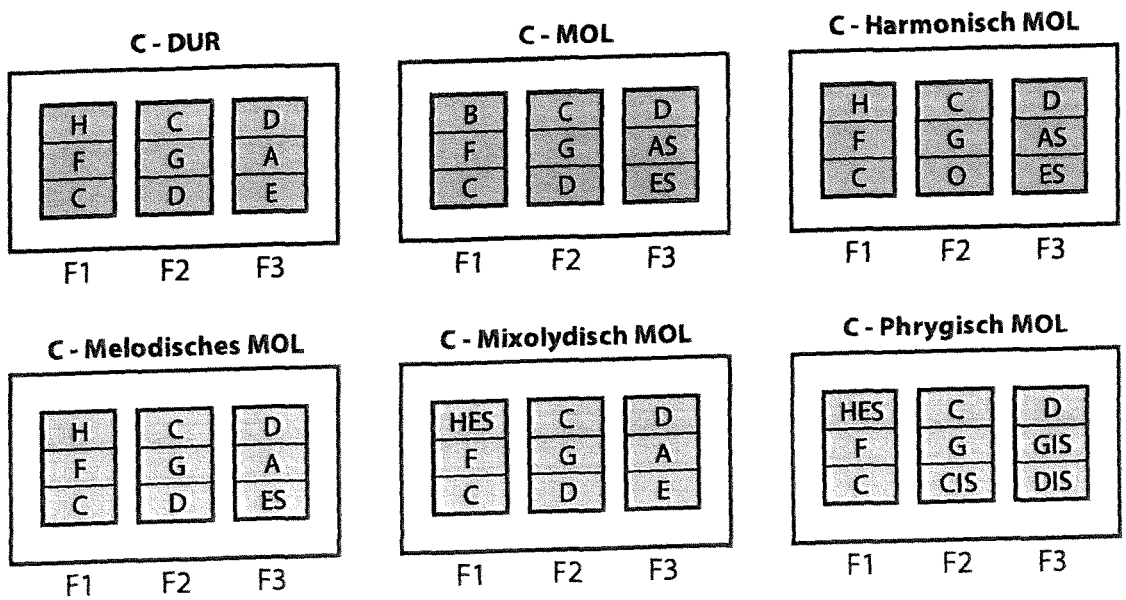

ET MUSIC KEYBOARDS: The drawing according to FIG. 6C shows a music keyboard that can be set according to the drawings. The keys on the keyboard can be pressed using individual fingers, finger combinations, chord strokes, using several fingers simultaneously. The keyboard has three lines and three columns, but may also be equipped with four lines and four columns; e.g., for musical scales that are higher in pitch by half tones. Octaves may be diminished or augmented using the thumb.

Ideally, writing should be possible with as little physical exertion as possible, in an ergonomically favorable way using one hand and blindly. The keyboards should be small so that they can be arranged according to the writer's preferences when they are writing. Single-hand keyboards are most advantageous, as the second hand remains free to be used for other tasks. This should allow for easy touch-typing without having to resort to just using one finger for typing single characters involving looking for keys with strained eyes and in a very focused way, covering large distances with the fingers.

The ET keyboards are based on full alphabets; it is, however, advantageous to write words using abbreviations that are automatically converted into full text or codes for retrieving and outputting stored texts without any errors.

SEPARATED SETS OF CHARACTERS: The (primary) characters of the German set of characters that are often used cover 80% of the characters needed, while the 18 (secondary) characters that are seldom used only cover 20%. Keeping this in mind, it is possible to limit the keys of the keyboard to the primary characters and provide alternative or compensatory strokes using the primary characters for the secondary characters.

DOUBLE STROKES PER CHARACTER: A reduction of the set of characters also offers the possibility to write the characters using two (or more) key strokes; cf. use of the numerical keyboard ETN (4.2).

According to Wikipedia, the 207 most used words (with up to five letters) in German cover half of all words. It is thus worthwhile to use abbreviations also for short words that are often used, e.g., zx=zurück (German for back), xk=Rückkehr (return), .lich=pünktlich (on time), etc.

Various Measures to Simplify Writing:
Converting lower-case letters in upper-case letters after a period, if possible;
Automatically converting suffixes;
Retroactively converting the firs letter of a word using a special key (tx): "austrian"+(tx)=Austrian; "convert"+(tx)=Convert;
Converting all characters into upper-case letters "Vienna"+(txx)="VIENNA;
B1: automatically writing the German letter [β] as two [ss]: [Gruss>Gruβ];
Using the German letter [.B] to write [sch]: [βule>Schule] (German for school);
Automatically converting letters into umlauts: [a-o-u] to [ä-ö-ü]. In case of exceptions, such as mochte-möchte or durfte-dürfte, both variations are available to choose from.
Automatically adding the [u] to obtain [qu]; [qer]>[quer];
Substitute characters for j [ii>j]; substitute characters for [qu]; [kwelle]>[Quelle].
Eliminating the letter "e" that accounts for 16.6% of all characters needed. In the German pronunciation of letters it is included when consonants are pronounced /be/ce/de/ef/ge/je/el/em/en/pe/que/er/es/te/we/, so that it can be automatically added, e.g., ghn=gehen.

TEXTUAL OPERATING INTERFACE: ET keyboards have textual operating interfaces for using text to retrieve programs and functions (using mnemonic codes) to avoid the complex functions of a computer mouse and the excessive use of gestures that blind people are often unable to use.

AUTOCORRECTION OF WRITTEN WORDS: Autocorrection is also provided for ET keyboards.

The entered or scanned real units pass through a hierarchical structure; on each hierarchical level, one piece of information from the tactile unit is sequentially output using stimuli or sounds. At first the group of characters to which the character belongs, then the block of characters in which the character is arranged and, finally, the position of the character within the block of characters. This sequential piece of information virtually conveys comprehensive information about the character to the recipient.

The table in FIG. 4A1 shows the hierarchical structure of the tactile characters of the set of characters without specifying every detail.

HIERARCHY 1: This is the group of characters (ZG) of the set of characters of the respective language: lower-case letters (1), upper-case letters (2), numeric characters (3) and punctuation and special characters (4).

The second column (R) shows which stimuli (R) are to be used to announce the group of characters (ZG) to the recipient: upper-case letters using the simultaneous stimuli (4+6); numeric characters using the simultaneous stimuli (1+3) and punctuation and special characters using the simultaneous stimuli (1+4). The most common lower-case letters to not require to be announced.

HIERARCHY 2: These are the character blocks (ZB) of the character groups.

In each character group, there are 6 character blocks which comprise 6 characters each. The drawing (FIG. 4B) shows that, when the lower-case letter "m" is written using chord strokes, the character group (ZG) does not have to be announced (0), for example, so that the first piece of information is the stimulus 3 of the character block (ZB).

HIERARCHY 3: These are the characters (Z) that are part of the character blocks. The drawing (FIG. 4B) shows that the lower-case letter "m" is located in the first position of character block 3. The second piece of information is thus stimulus 1 of the character. The character "m" thus comprises the sequentially output stimuli 3 (of stimulus body 3) and 1 (of stimulus body 1).

SUPER-HIERARCHIES: There could also be super-hierarchies upstream of the hierarchies 1-3, such as codes for retrieving words, key words or personal information.

The table in FIG. 4A2 shows the hierarchical structure of the acoustic signs of the set of characters without going too much into detail.

The hierarchy was adapted to the tactile signs, the selected colors symbolizing sounds; not that numerous other categories may be chosen for the acoustic signs.

The column (S) points out that the same sounds, but other pitch levels may be used for announcing the character group.

SUPER-HIERARCHIES: Acoustic outputs offer almost endless options for expanding the textual inputs.

The stimuli (R) are output using artificial stimulus bodies (RK). Several of these stimulus bodies may thus come into question, optionally even cutaneous or subcutaneous electrostimulation. Tests have shown that certain piezo-electric oscillators are well suited; future better solutions are included in the scope of the invention, however.

The stimulus bodies (RK) may be mounted individually or in stimulus displays (DY) together with other RK to the body of a recipient.

The drawing (FIG. 3A1) shows a blind man having a stimulus body (RK) mounted to his right forearm and a stimulus display (DY) mounted to his left forearm. The drawings according to FIG. 3A3 and FIG. 3A4 show that he may use his left hand to operate two different keys while standing up. This means that he may also communicate with a person standing close-by via Bluetooth; a particularly advantageous substitute for the communication using the Lorm alphabet; cf. 2.1 D and 6.4.

The drawings according to FIG. 3A2a and FIG. 3A2b show that the blind man wears a chameleon display (CD) that includes three stimulus bodies (1-2-3) on his chest and three stimulus bodies (4-5-6) on his shoulder. They are invisible between his outer and inner garments (t-shirt) so that they cannot be seen by other persons. A rubber belt may be used as a complement to securely fix the display on the body.

BUZZER FOR ACOUSTIC OUTPUT: Such devices and equipment for acoustic output and reception via ear phones and/or hearing-aids are much less complex, smaller, handier and cheaper than those for outputting tactile stimuli. Some people may perhaps also use bone conduction or cochlear implants for perceiving the sounds.

Acoustic signals are also used for numerous purposes for blind people. They may be advantageously used for virtually reading texts, as there is an almost infinite number of sounds (signals) that can be used. It is remarkable that many blind people can achieve high reading rates when using synthetic speech output. It is, however, a disadvantage of acoustic output that it cannot be used for people who are not able to hear.

Self-Monitoring Using Tactile Signs

A: Example according to FIG. 4B:

On the keyboard according to FIG. 5G 31 characters can be written using 9 keys and chord strokes; the lower-case letter "m" is written striking the keys a+c. When the character "m" is written on the keyboard, the corresponding letter "m" is retrieved from the hierarchical structure.

Stimulus 3 is output using stimulus body 3 (RK3) and stimulus 1 is output using stimulus body 1 (RK1). The stimuli are output electronically and rapidly, so that output and input take place practically simultaneously.

Example of a super-hierarchy when using a multipurpose keyboard according to FIG. 6D. This multipurpose keyboard has 9 alphabetical and 9 numerical keys that are particularly suited for retrieving words and other text units using codes. If you want to write the word "Österreich" (German for Austria), for example, an upper-case "L" (for countries of the world), then the continent "3" (for Europe) and then a lower-case "o" (for Österreich) may be written: "L3o"=Österreich.

Self-monitoring using acoustic sounds works the same way as with tactile signs.

Reading Texts Written by Others

The principle of self-monitoring of texts that one has written oneself may also be used when reading any texts written by other people. Words and other text units written in full text can be converted into short text using compression software in order to accelerate the reading rate. Abbreviations used by the writer can be taken into account. The reading rate is determined by the reader themselves; they may also always interrupt the reading process at any time.

As has already been described above, reading texts written by others always requires that the characters have been digitized. If they are not available in a digital form, an OCR scanner has to be used to convert them.

Written Communication with Other People

Written texts may be communicated interactively via e-mails, as SMS or Skype, even via short distances using Bluetooth; it is also possible that the recipients include several people with and without visual impairment. This is particularly important for deaf-blind people.

6.6 Automatic Reception of Important Messages

The lack of mobility among blind people is mainly due to the fact that head and chest are insufficiently protected when walking using a cane. The invention thus provides ultrasound, laser and radar devices that are positioned in miniature forms on glasses, chest and/or on the cane's upper end; cf. FIG. 7A. If there is danger ahead, an oscillator may be activated that is positioned in another position on the recipient's body. Such automatic messages to the recipient may also include wake-up or reminder signals.

B: For such volatile outputs, oscillators (stimulus bodies) may be used to output tactile signs. In these cases, all vibrations may be output simultaneously and continuously.

Manually Retrieving Measurement Data from Other Devices

Most operable and automatic devices have visual displays and are only equipped with speech output in very few countries so that they are not accessible for blind people.

Examples in household devices: kitchen and body scales, microwave ovens, washing machines, calculators, blood pressure measuring devices, measuring tapes, etc.

Exemplary Use in Clocks and Watches

The most frequently used devices are clocks, in particular watches. This holds also true for blind people for whom there are speaking and a few tactile watches. The speaking watches often offer only minor quality, as blind people do not like to use them because it immediately shows other people that they are blind. Analog watches are the most popular watches; with these watches, a glass cover has to be lifted to allow for sensing the numbers with a forefinger. There are only a few blind people who are able to master that.

The invention thus provides universal tactile keyboards with a hierarchical structure on which the time of the day is output using vibrations after pressing the right key. This process can be used not only for watches, but also for many automatic and operable measuring devices.

Speech Recognition and Full Text Output

Retrieving the Time of the Day from Watches

The Hierarchy of Daytimes: Cf. Character Groups (ZG).

The drawing according to FIG. 4A3 shows hierarchy 1: the hours of the day (12 or 24), hierarchy 2: 10-minute intervals of the hours, and hierarchy 3: the minutes within the ten-minute intervals.

The Hotspots: Cf. Character Blocks.

The hours of the day have 4 hotspots (HS) that can be used for morning and afternoon. Three vibrations are output for every hotspot. Vibrations are only output in the respective hotspot that indicates the current hour of the day: one vibration fort he first hour, two vibration for the second hour, and three vibrations for the third hour of each hotspot.

The Number of Keys for Retrieving the Current Time Unit:

The retrievals are made using three keys in our example, so that one key can be used for each hierarchy; see below. Versions with one or two keys in which short and long strokes can be distinguished may also be provided, however.

Retrieval of the Current Hour of the Day:

Pressing key 1 for a long time allows for distinguishing a.m. and p.m.: special vibration for 0-12 (~) and special vibration for 12-24 (–).

Normal stroke on key 1: the first key stroke (T1) queries the hotspot 1 of the hours (1-2-3); if there is no vibration, a second key stroke (T2) is used to query the second hotspot 2 of the hours (4-5-6); if there is no vibration, a third key stroke is used to query the hotspot 3 of the hours (7-8-9); if there is not vibration, a fourth key stroke is used to query the hotspot 4 of the hours (10-11-12). A maximum of 4 key strokes and a minimum of one key stroke, i.e. an average of 2.5 key strokes, a maximum of 3 brief vibrations being output per query, so that it is not necessary to keep count of them.

Retrieval of the 10-Minute Interval of an Hour:

Normal stroke on key 2: The first key stroke (T2) is also used to query hotspot 1; if there is no vibration, key 2 is pressed a second time. A vibration can be expected in this case. A maximum of 2 key strokes, a minimum of 1 key stroke, i.e. an average of 1.5 key strokes, a maximum of 3 brief vibrations being output per query, so that it is not necessary to keep count of them.

Retrieval of the Minutes within a 10-Minute Interval:
Normal stroke of key 3:

The first key stroke is also used to query hotspot 1 (HS1); if there is no vibration, key 2 is kept pressed until there is a vibration as with the hours. A maximum of 4 key strokes, a minimum of 1 key stroke, i.e. an average of 2.5 key strokes, a maximum of 3 brief vibrations being output per query, so that it is not necessary to keep count of them.

According to the invention, an input unit and/or output unit is used to input and output a text consisting of characters as a combination of full text and short text, the input and/or output short text comprising at least one abbreviation in the form of characters of character combinations to which predefined full text contents have been allocated.

The characters of the text are input via a keyboard by combining numeric and/or alphanumeric characters, preferably to numeric characters.

Without any limitations, this is done preferably using single-finger keyboards.

Single-finger keyboards are used to write the characters using one finger of the left or right hand. Like all other keyboards, they have a real and any number of virtual (3D) keyboard interfaces that correspond to the real keyboard interface and may be retrieved; this can be compared to the shift function of PCs for upper-case letters, the texts being writable as full and short text.

The characters of the text are input by pressing keys of the keyboard, that are characterized by numeric characters and/or letters, for example.

When a numeric keyboard is used, the characters of the text are thus not written directly, but using two numeric characters (0-9), so that 100 key strokes of numeric characters (00-99) can be written on the real keyboard interface; retrieving further virtual keyboard interfaces adds 100 further characters.

As the keyboard needs only a few keys, it may be very small in size.

Single-finger keyboard "JOE"

Figure 8:
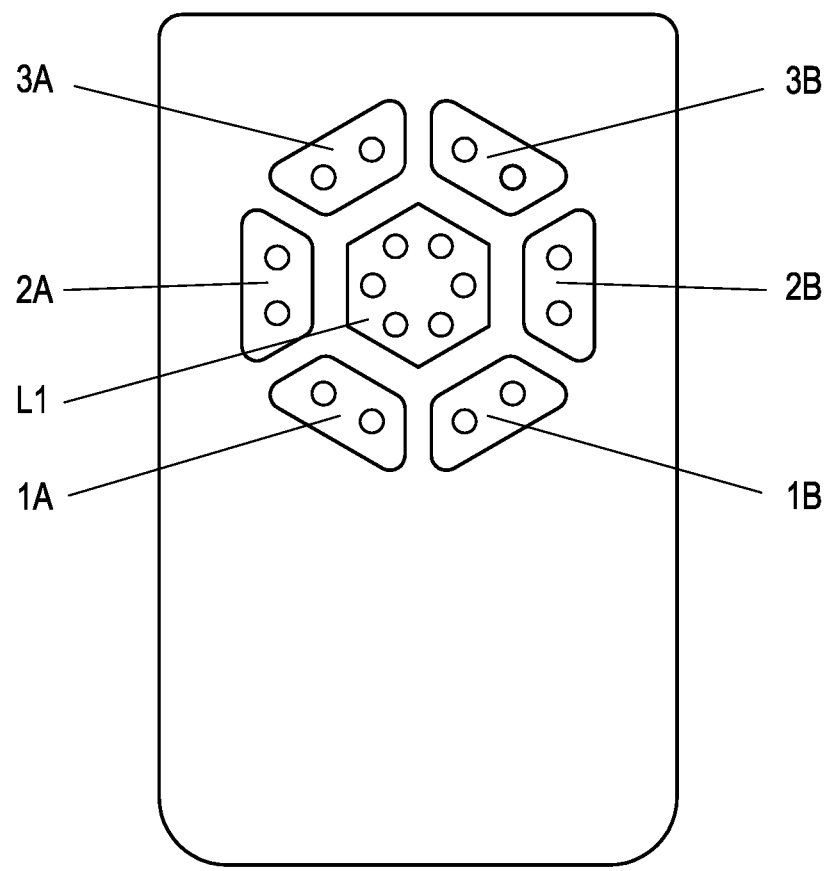
FIG. 8 shows a schematic top view of an embodiment of a keyboard of the invention.

According to FIG. 8, the single-finger keyboard Joe has 7 keys (1A-2A-3A-3B-2B-1B-L1), (L1) being a conventional space key.

The other keys are arranged in an oval shape, ring shape or trapezoidal shape around (L1). The asterisks on the surrounding keys indicate that they may have tactile marks, if this makes it easier to identify them blindly. In the initial position, the finger is positioned on the space key (L1).

FIG. 9A shows all the 13 stroke positions on the above 7 keys and FIG. 9B shows six combined strokes (12A-23A-3AB-23B-12B-1AB) each of which presses two adjacent keys together.

FIG. 9C shows the numbers (1-2-3-4-5-6-7-8-9-0), the numbers being automatically written when a number key is struck two times. The key (10) is only used as key (0). The keys (11-12-13) are intended for simple strokes. The key (11/back) is the delete key like the backspace key for PCs; the combination key (12) is the space key (L2) that is used for retrieving stored abbreviations; the key (13) is a conventional space key (L1).

FIG. 9C1 shows combined strokes of the key (13/L1) and the keys (1-3-5-7-9-11). These strokes may be programmed for any purpose, as illustrated by the examples (13+1) (13+3) (13+5). Example: When one or several numbers are to be written, the number key (13+1) is activated and then deactivated again. When the next letter is an upper-case letter, the key combination (13+3) is pressed; if all letters are to be written in upper case, (13+3) is struck two times and simply deactivated later on. If the calculating function of the keyboard is to be used (not shown), the key combination (13+5) is activated, etc.

Need for control functions: (C1) can be used to open (a) virtual key interfaces and menus for control and any other functions.

FIG. 9D shows the 100 (00-99) double key strokes, (00) not being taken into account, as the alphabet was started deliberately with (01=a) and ended with (30=B), so that (00) can be used to retrieve a virtual keyboard interface of a menu or for other important purposes.

In this example, operating functions (C1) were deliberately provided for writing numeric characters and upper-case letters, without including them in the table in FIG. 9D.

FIG. 9E shows the double key strokes for punctuation and special characters. There is also an alternative option for their input. Next to the most commonly used punctuation and special characters, it consists in using mnemonic abbreviations for retrieving these characters, so that the question mark "?" may be written by inputting "fz", "frage" or "fragezeichen" and converting them automatically by pressing the space key (L2). Thus, it is not necessary to learn all the punctuation and special characters that are only rarely used. Only very few numeric characters are required for writing, so that they can be used for more important purposes, such as for extending operating commands.

The basic position of the finger on the single-finger keyboard Joe is in the center of the keyboard from where the stroke positions can be reached after having covered a very short distance with the finger.

Figure 10:
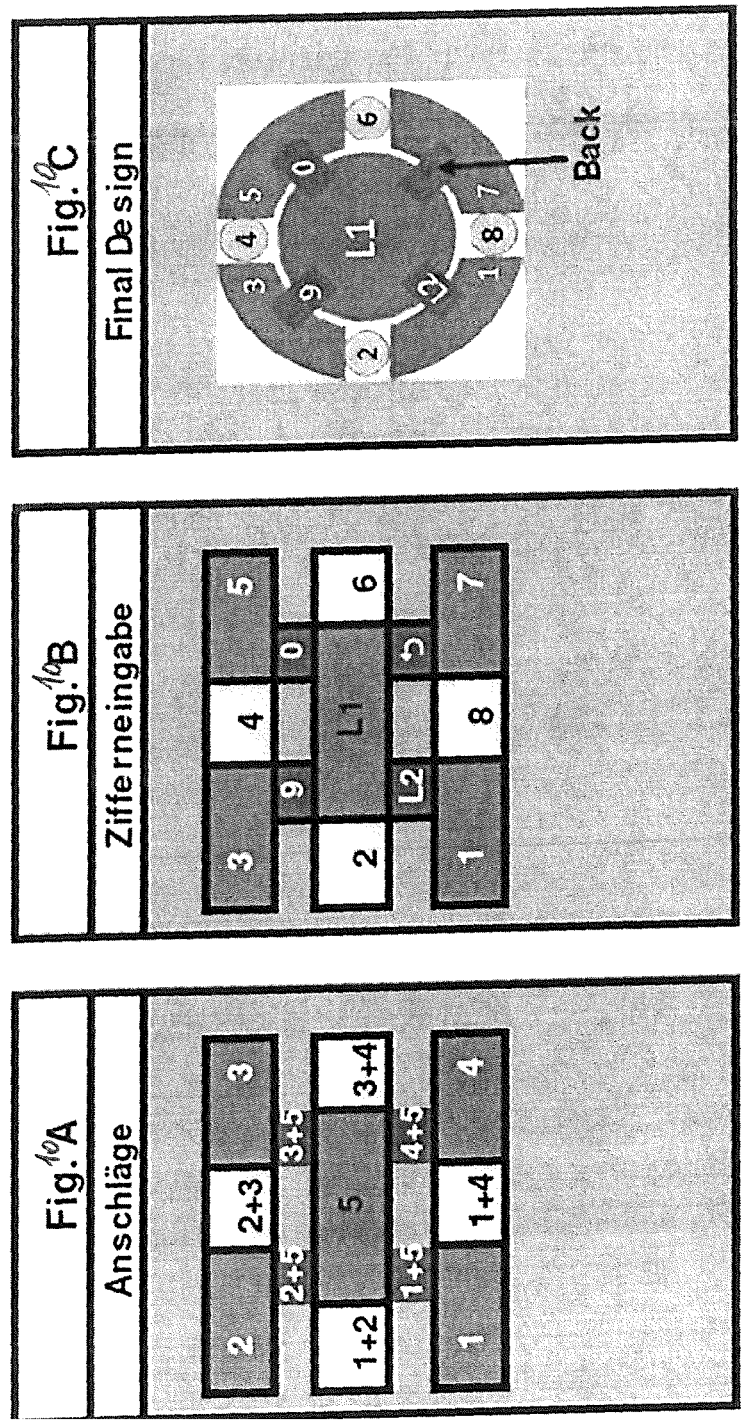
FIG. 10C shows a schematic top view of an embodiment of a keyboard of the invention and FIGS. 10A and 10B show the key allocations for the keyboard according to FIG. 10C.

The single-finger keyboard "Alpha" according to FIG. 10C only requires 5 keys, but still has 13 stroke positions. It just offers 4 operating functions instead of 6. This disadvantage may, however, be compensated by providing a menu function that allows for activating numerous operating and other functions instead of an operating function; in addition, it also allows for retrieving one or more virtual keyboard interfaces in this way. The input matrix for lower-case letters and character combinations does not have to be restricted, either; see FIG. 9D of the single-finger keyboard Joe.

Table 1 shows an example of inputting the full text "Patent Caretec" using a single-finger keyboard.

Each character of the full text is input using key strokes of two allocated numeric characters, e.g. 1+6 is input for "P", 0+1 is input for "a". A blank space is input between each two words of the full text.

TABLE 1

| Letter | Keys used acc. to FIG. C | Keys used acc. to FIG. A | Comment |
|---|---|---|---|
|   | (13/L1 + 3) | (L1 + 2A) | upper case |
| P | 1 + 6 | 1A + (3A + 3B) |   |
|   | (13/L1 + 3) | (L1 + 2A) | lower case |
| a | 0 + 1 | (1B + 2B) + 1A |   |
| t | 2 + 0 | (1A + 2A) + (1B + 2B) |   |
| e | 0 + 5 | (1B + 2B) + 3A |   |
| n | 1 + 4 | 1A + (2A + 3A) |   |
| t | 2 + 0 | (1A + 2A) + (1B + 2B) |   |
|   | 13/L1 | L1 | blank |
|   | (13/L1 + 3) | (L1 + 2A) | upper case |
| C | 0 + 3 | (1B + 2B) + 2A |   |
|   | (13/L1 + 3) | (L1 + 2A) | lower case |
| a | 0 + 1 | (1B + 2B) + 1A |   |

TABLE 1-continued

| Letter | Keys used acc. to FIG. C | Keys used acc. to FIG. A | Comment |
|---|---|---|---|
| r | 1 + 8 | 1A + (2B + 3B) | |
| e | 0 + 5 | (1B + 2B) + 3A | |
| t | 2 + 0 | (1A + 2A) + (1B + 2B) | |
| e | 0 + 5 | (1B + 2B) + 3A | |
| c | 0 + 3 | (1B + 2B) + 2A | |
| | 13/L1 | L1 | Leerzeichen |

Expressions in brackets are chord or combined key strokes. Table 2 shows an example of an individually programmed abbreviation of the word "Patent" using a single-hand keyboard.

TABLE 2

| Letter | Keys used acc. to FIG. C | Keys used acc. to FIG. A | Comment |
|---|---|---|---|
| | 13/L1 + 7 | (L1 + 3B) | Start programming of abbreviations |
| P | 1 + 6 | 1A + (3A + 3B) | Text of abbreviations |
| a | 0 + 1 | (1B + 2B) + 1A | |
| t | 2 + 0 | (1A + 2A) + (1B + 2B) | |
| e | 0 + 5 | (1B + 2B) + 3A | |
| n | 1 + 4 | 1A + (2A + 3A) | |
| t | 2 + 0 | (1A + 2A) + (1B + 2B) | |
| | 12 | (1A + 1B) | blank 2 |
| p | 1 + 6 | 1A + (3A + 3B) | abbreviation code |
| a | 0 + 1 | (1B + 2B) + 1A | |
| | 13/L1 + 7 | (L1 + 3B) | Stop programming of abbreviations |

Inputting "Patent Caretec" using full text and short text is illustrated as an example in Table 3. After having input the letters "p" and "a", a space 2 follows so that it becomes clear that it is an abbreviation for which the word "Patent" is then retrieved.

TABLE 3

| Letter | Keys used acc. to FIG. C | Keys used acc. to FIG. A | Comment |
|---|---|---|---|
| p | 1 + 6 | 1A + (3A + 3B) | |
| a | 0 + 1 | (1B + 2B) + 1A | |
| | 12 | (1A + 1B) | blank 2 |
| | (13/L1 + 3) | (L1 + 2A) | upper case |
| C | 0 + 3 | (1B + 2B) + 2A | |
| | (13/L1 + 3) | (L1 + 2A) | lower case |
| a | 0 + 1 | (1B + 2B) + 1A | |
| r | 1 + 8 | 1A + (2B + 3B) | |
| e | 0 + 5 | (1B + 2B) + 3A | |
| t | 2 + 0 | (1A + 2A) + (1B + 2B) | |
| e | 0 + 5 | (1B + 2B) + 3A | |
| c | 0 + 3 | (1B + 2B) + 2A | |
| | 13/L1 | L1 | blank |

After conversion, the text may also be output as full text or as a combination of full text and short text.

Abbreviations can be marked in various ways to allow for finding out whether a term is an abbreviation while reading the output text.

Smart phones with speech recognition can convert spoken texts into written texts, for example. According to the invention, the written texts may be output as a combination of full text and short text. The short text may be displayed in a different color from the full text or in italics, for example, or highlighted in any other way.

When the combination of full text and short text is output in a tactile way, the short text may be output using another oscillation frequency so that the user can distinguish it from full text.

When the short text is output, the original set of abbreviations can be used or it is converted using abbreviation definitions that the reader is familiar with.

What is claimed is:

1. A method for inputting and outputting a text comprising characters, said text being input using an input unit in the form of a combination of full text and short text, said input unit comprising a reduced alphanumeric keyboard, said short text containing at least one abbreviation in the form of characters or character combinations to which predefined full text contents have been allocated, wherein, when inputting the text, a space bar (L1) is actuated after each full text word and a predefined key (L2) that is different from the space bar (L1) is actuated after each abbreviation to separate each full text and each short text from any other full text or short text, the text, when output using an output unit, being optionally output in the form of a combination of full text and short text and the output short text containing at least one abbreviation in the form of characters or character combinations, wherein the predefined key (L2) is a tactile key, the predefined key (L2) having a fixed location on the keyboard that is different from the space bar (L1)), thereby enabling a person to blindly locate and select the predefined key (L2) in order to separate each short text from any other full text or short text that is input.

2. The method according to claim 1, wherein the predefined full text contents allocated to the abbreviations are text parts, sentences, words, phrases, standard texts, or the like.

3. The method according to claim 1, wherein the characters of the combination are numeric and/or alphanumeric characters, preferably two numbers of a keyboard.

4. The method according to claim 1, wherein the output is stored electronically or transmitted and output in the form of a combination of full text and short text.

5. The method according to claim 1, wherein characters of a set of characters are used for inputting and outputting a readable text, said characters being input using a keyboard with a plurality of keys and output via the output unit, the characters or combinations of characters being buffered and/or transmitted between input and output, and in that the characters, when input, are input either as full text or as short text, so that full text and short text sections are input alternatingly, abbreviations in the form of characters or combinations of characters being defined for inputting the short text sections, said abbreviations being selectable via allocated character combinations.

6. The method according to claim 5, wherein full text and short text sections are output alternatingly when the readable text is output.

7. The method according to claim 1, wherein the definitions used for the at least one abbreviation during input or other abbreviation definitions are used for outputting the short texts.

8. The method according to claim 1, wherein the short text sections are converted into full text sections and displayed with the existing full texts sections before the readable text is output.

9. The method according to claim 1, wherein each of the full text sections comprises one or more of characters of a set of characters, syllables, words, idioms, standard texts, or textual information.

10. The method according to claim 1, wherein each of the short text sections comprises abbreviations for retrieving the stored full texts.

11. The method according to claim 1, wherein the input characters are output via a tactile stimulus generating device by means of tactile output.

12. The method according to claim 1, wherein the input characters are output via a tactile stimulus generating device by means of tactile output for being checked or corrected and are optionally additionally buffered or in that the text available as full text or short text is transmitted to a remote receiver.

13. The method according to claim 1, wherein the input characters are output via a tactile stimulus generating device by means of tactile output for being checked or corrected and are additionally converted into full text and speech.

14. The method according to claim 1, wherein bidirectional communication takes place between a first and a second communication partner, the first communication partner inputting full text and short text via a keyboard, the texts being converted into speech and the verbal response of the second communication partner being converted into full text and short text and output via a tactile stimulus generating device.

15. The method according to claim 1, wherein the characters are input via a single-hand keyboard using a plurality of keys, one or several keys being actuated simultaneously.

16. The method according to claim 1, wherein the characters are input via a single-hand keyboard using a plurality of keys and several keys are actuated simultaneously.

17. The method according to claim 1, wherein characters are input using chord strokes, the chord strokes being performed using one finger to press adjacent keys simultaneously.

18. The method according to claim 1, wherein characters are input using chord strokes, the chord strokes being performed using a plurality of finger to press adjacent keys simultaneously.

* * * * *